United States Patent [19]

Kitamura et al.

[11] Patent Number: 4,604,797
[45] Date of Patent: Aug. 12, 1986

[54] METHOD FOR AUTOMATICALLY ATTACHING SUB-ASSEMBLY TO MAIN ASSEMBLY AND SYSTEM THEREOF USING INDUSTRIAL ROBOTS

[75] Inventors: Kengo Kitamura, Koshigaya; Hitoshi Murata, Zama, both of Japan

[73] Assignee: Nissan Motor Company, Limited, Yokohama, Japan

[21] Appl. No.: 567,178

[22] Filed: Dec. 30, 1983

[30] Foreign Application Priority Data

Feb. 5, 1983 [JP] Japan .................................. 58-16903

[51] Int. Cl.⁴ ............................................ B23P 19/00
[52] U.S. Cl. ........................................ 29/783; 29/789
[58] Field of Search ................ 29/783, 787, 791, 789, 29/793–795, 797

[56] References Cited

U.S. PATENT DOCUMENTS

| | | | |
|---|---|---|---|
| 1,656,000 | 1/1928 | Hubener ................... | 33/169 |
| 3,680,194 | 8/1972 | Monaghan et al. ............ | 29/791 X |
| 3,885,295 | 5/1975 | Engelberger et al. ......... | 29/429 |
| 4,155,169 | 5/1979 | Drake et al. . | |
| 4,292,734 | 10/1981 | Swanson et al. ............. | 29/791 |

OTHER PUBLICATIONS

VDI–Zeitung, U. Rembold et al: "Technische Anforderungen an zukuenftige Montageroboter", vol. 123, No. 18, Sep. 1981, pp. 767 and 777.

*Primary Examiner*—Howard N. Goldberg
*Assistant Examiner*—Timothy V. Eley
*Attorney, Agent, or Firm*—Schwartz, Jeffery, Schwaab, Mack, Blumenthal & Evans

[57] ABSTRACT

A method and system for automatically attaching a sub-assembly such as a strut to a main assembly such as a vehicle body frame in a production line. The method involves the steps of moving the sub-assembly including a separable engagement means to a predetermined location of the main assembly, anchoring the engagement means of the sub-assembly to a positioning part located at the predetermined location of the main assembly so as to temporarily attach the sub-assembly to the main assembly, moving an automatic fastening tool to the opposite side of the predetermined location of the main assembly to which the sub-assembly is attached and tightening fasteners in the automatic fastening tool onto the sub-assembly so as to permanently attach the sub-assembly to the predetermined location of the main assembly. The engagement means can then be removed. Since the sub-assembly is temporarily attached to the predetermined location of the main assembly, the tightening operation of a fastener is simplified and can be carried out at a different working station, in addition to various other advantages.

4 Claims, 29 Drawing Figures

FIG.3
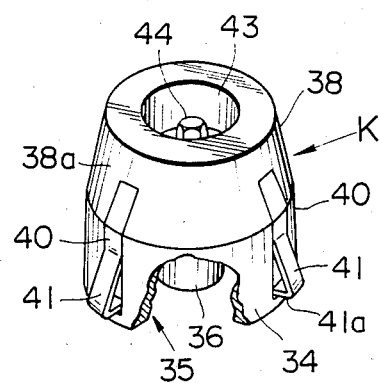
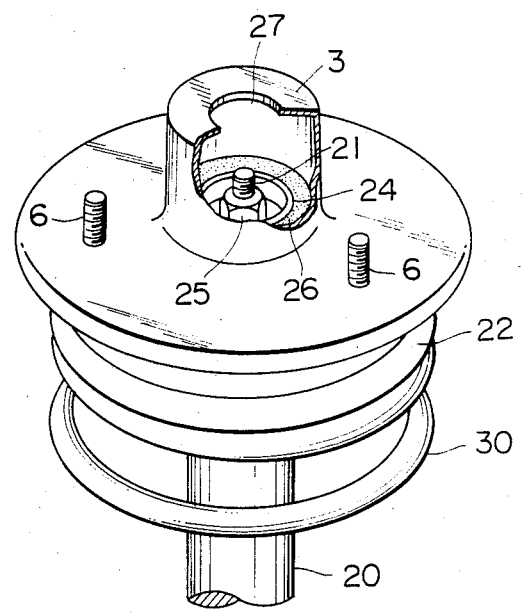

FIG.16
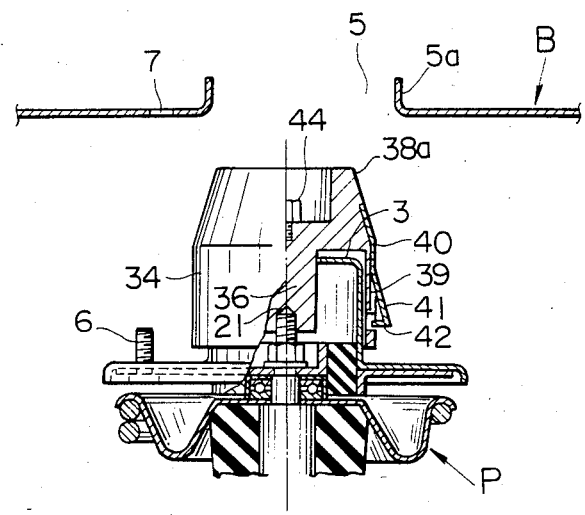
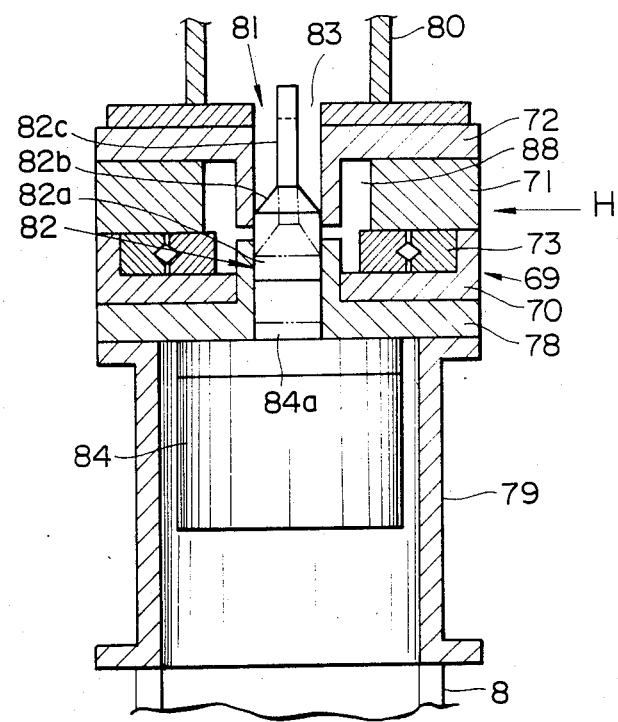

METHOD FOR AUTOMATICALLY ATTACHING SUB-ASSEMBLY TO MAIN ASSEMBLY AND SYSTEM THEREOF USING INDUSTRIAL ROBOTS

BACKGROUND OF THE INVENTION

The present invention relates to a method for automatically attaching a sub-assembly such as a vehicle part to a main assembly such as a vehicle body frame, and particularly to an improvement in the process of automatically attaching a sub-assembly, such as a strut assembly, to a predetermined location of the main assembly, such as a vehicle body frame, via sets of fasteners, such as bolts and nuts.

Conventionally, in an assembly line for automotive vehicles, a plurality of operators carry out manual attachment operations by which a strut assembly of a strut-type front suspension (hereinafter, referred to simply as a strut) is attached to a predetermined location on a car body frame (referred to simply as a vehicle body) mounted on a conveyer belt. In detail, one operator carries one of the struts stored in a bin toward the vehicle body, fits an upper positioning portion of the carried strut into a positioning hole provided in the vehicle body, and grasps the strut so as to hold it in place in the positioning hole of the vehicle body. Another operator then moves a fastening tool for a fastener such as a nut to the predetermined location on the vehicle body where nuts held by the fastening tool are tightened onto each bolt extending from the strut and penetrating through holes provided around the predetermined location on the vehicle body. In this way, the manual attachment operation of the strut to the vehicle body is completed. However, it is extremely troublesome for the operators to carry out the above-described attachment operation because of many disadvantages, e.g., the struts are relatively heavy. Therefore there is an increasing demand for automating attachment operations such as attaching struts to the vehicle body.

To meet this industrial demand, a method for automatically attaching struts to a vehicle body using industrial robots has been proposed.

In one such method, when the vehicle body transported along a conveyer belt reaches a predetermined location of a working station, the required strut is grasped by one robot and carried toward a predetermined location of the vehicle body and, at this time, an automatic fastening tool is moved to the predetermined position opposite the carried strut by means of another robot and the strut is automatically fastened to the vehicle body. In this case, each of the robots moves along a trajectory preset by a teaching method involving a dryrun manipulation of each robot or a teaching box so as to carry the strut or fastening tool to opposite sides of the predetermined location on the vehicle body.

However, since the accuracy of the stopped position of the vehicle body transported by the conveyer belt is relatively low due to the current control technology for conveyer belt systems, the working positions of both the strut and the fastening tool, carried by the respective robots instructed by means of the above teaching method, generally deviate slightly from the normal stopped position. Therefore, although it is necessary to carry the strut to a position appropriate for attaching the strut to the vehicle body and also to locate the fastening tool appropriately for fixedly attaching the strut to the vehicle body, it requires a lot of time for the respective robots to accurately position the strut and the fastening tool separately opposite the predetermined location of the vehicle body. Consequently, such an automation method as described above will not minimize the total operation time required to automatically attach the strut to the vehicle body. In addition, if the respective robots are adapted to separately position the strut and the fastening tool opposite the predetermined position of the vehicle body, a control unit storing preprogrammed instructions by which the respective robots carry the strut and the fastening tool to their respective given positions opposite the predetermined location of the vehicle body is additionally required in order to correct for the positioning error of the vehicle body so that the overall system for automatically attaching the strut to the vehicle body becomes complicated.

With these problems in mind, the Applicants have already filed previously an application for patent in U.S. as Ser. No. 534,241 and EPO as Ser. No. 83109404.0 entitled "METHOD AND SYSTEM FOR AUTOMATICALLY ATTACHING SUB-ASSEMBLY TO MAIN ASSEMBLY USING INDUSTRIAL ROBOTS", both filed 21th Sept. 1983. The system disclosed therein will be briefly described below. A vehicle body is transported along a conveyor belt and is stopped at the predetermined location of an attaching station. Thereupon, one of the struts stored in a bin is grasped and carried by one robot toward the vehicle body stopped at the station, while the fastening tool is carried toward the vehicle body by means of another robot. In this situation, the strut is automatically attached to the vehicle body by means of fasteners. However, since the strut is not fixed to the vehicle body when the strut is to be positioned opposite the predetermined position on the vehicle body, the one of the two robots which has carried the strut to the vehicle body needs to support the positioned strut until a adequate number of fasteners have been completely tightened onto the opposing fasteners provided on the strut by means of a fastening tool.

Therefore, the free working space of the other robut which carries the fastener fastening tool to the predetermined location on the vehicle body is limited by the first robot supporting the strut at the predetermined location on the vehicle body. Consequently, the programming for the second robot through the teaching method becomes complicated.

SUMMARY OF THE INVENTION

With the above-decribed problem in mind, it is an object of the present invention to provide a method for automatic attachment of a sub-assembly to a main assembly which achieves automatic attachment of the sub-assembly to the main assembly in an assembly line for automotive vehicles and allows sufficient free working space for the robot to which the fastening tool is attached.

The method for automatically attaching a vehicle part to a vehicle body according to the present invention can be achieved by the following steps: positioning the vehicle part, on which an engagement member is previously mounted, or built at a predetermined position on the vehicle body by means of a first robot; attaching the vehicle part to the vehicle body, the engagement member of the vehicle part engaging the vehicle body detachably; and thereafter positioning a fastening tool at the predetermined position of the vehicle body by means of a second robot.

The system for automatically attaching the vehicle part to the vehicle body according to the present invention comprises: an engagement member previously and detachably attached to or previously formed on the vehicle part; and two robots, one of the robots having a mechanical hand which grasps a vehicle part and engages the engagement member to a positioning portion of the vehicle body, the other robot having an automatic fastening tool and fastening the vehicle part engaging the vehicle body to the vehicle body by means of fasteners.

BRIEF DESCRIPTION OF THE DRAWINGS

A more complete understanding of the present invention may be obtained from the following detailed description taken in conjunction with the drawings in which like reference numerals designate corresponding elements and in which:

FIG. 3 is an exploded perspective view of the engagement member shown in FIG. 2;

FIG. 16 is an elevation in partial section of essential parts of the strut and the engagement member showing the step of positioning the strut below a positioning hole in the strut tower of the vehicle body;

DETAILED DESCRIPTION OF THE PREFERRED EMBODIMENTS

Reference will be made hereinafter to the attached drawings in order to facilitate understanding of the present invention.

Figure 1:
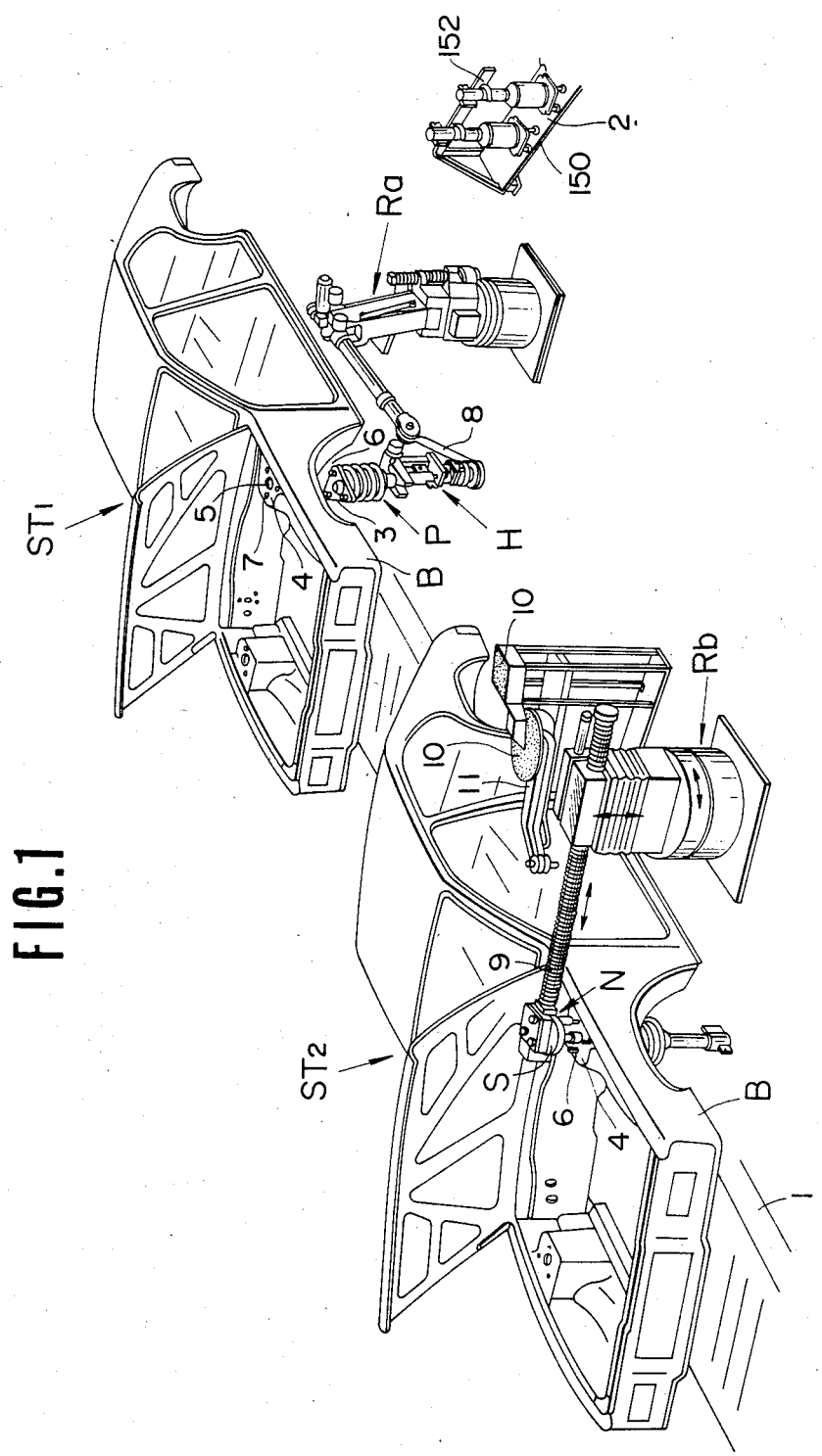
FIG. 1 is a perspective view of an assembly line for automotive vehicles to which the present invention is applicable showing schematically an automatic attachment process by which a strut is attached to a strut tower of a vehicle body using two industrial robots.

FIG. 1 shows a rough sketch of the overall process of automatically attaching a vehicle part, e.g., a suspension strut to a vehicle body, i.e., to a strut tower formed in the left front side of the body frame, i.e., vehicle body.

The vehicle body B assembled in a form as shown in this drawing is transported by a conveyor belt 1. As the vehicle body B on the conveyor belt 1 arrives at each of two predetermined working stations $ST_1$ and $ST_2$, the vehicle body B is stopped. A bin 2 which temporarily stores a plurality of struts P is previously placed at an appropriate position within the first working station ST₁.

The system for automatically attaching the strut to the vehicle body in this embodiment comprises: an engagement member K (FIG. 2) detachably attached to an upper casing 3 of the strut P; a first robot Ra having a mechanical hand H at the free end of a multi-articulated arm 8 thereof which grasps the strut P, the robot Ra being installed at the first working station ST₁ adjacent to the conveyer belt 1; and a second robot Rb having a nut fastening tool N at the free end of a multi-articulated arm 9 thereof via a supporting apparatus, the robot Rb being installed at the second working station ST₂ located downstream of the first working station ST₁ on the conveyer belt 1.

It should be noted that the first and second robots Ra and Rb are multi-articulated, play-back-type robots. These robots are pre-programmed by a process called "teaching". Before use in automated assembly, each robot is operated manually to perform all of the movement and manipulation steps required in the automated process. The instructions used during this manual dry-run are recorded for reproduction in the automated assembly process.

At the first working station ST₁, the first robot Ra grasps one of the struts P arranged in the bin 2 with its mechanical hand H according to pre-programmed instructions (entered by the "teaching" process) and carries the grasped strut P to a predetermined position on the vehicle body B. Thereafter, the robot Ra moves an engagement member K, the construction of which will be described later, previously mounted on the tip of the strut P, into engagement with a positioning hole 5 in a surface of a strut tower 4 formed in the vehicle body B in order to detachably attach the strut P to the vehicle body B. Once the strut is so attached, a plurality of bolts 6 extending vertically from the upper casing 3 of the strut P protrude through holes 7 arranged in the upper casing 3 of the strut tower 4 so as to match the locations of the bolts 6. At the second working station ST₂, the robot Rb moves the nut fastening tool N to a predetermined position on the vehicle body B, specifically to a point above the strut tower 4 of the vehicle body B, according to pre-programmed instructions ("teaching"). Thereafter, the robot Rb moves the nut fastening tool N into contact with the engagement member K so that the nuts 10 carried by the fastening tool N can be tightened onto the above-mentioned bolts 6 of the strut P. Consequently, the strut P is fixedly attached to the strut tower 4 of the vehicle body B.

It should be noted that in FIG. 1 reference numeral 11 denotes a nut feed which stores a number of nuts 10 and continually feeds the nuts 10 in suitable alignment to the nut fastening tool N whenever the vehicle body B on the conveyer belt 1 arrives at the second working station ST₂.

Figure 2:
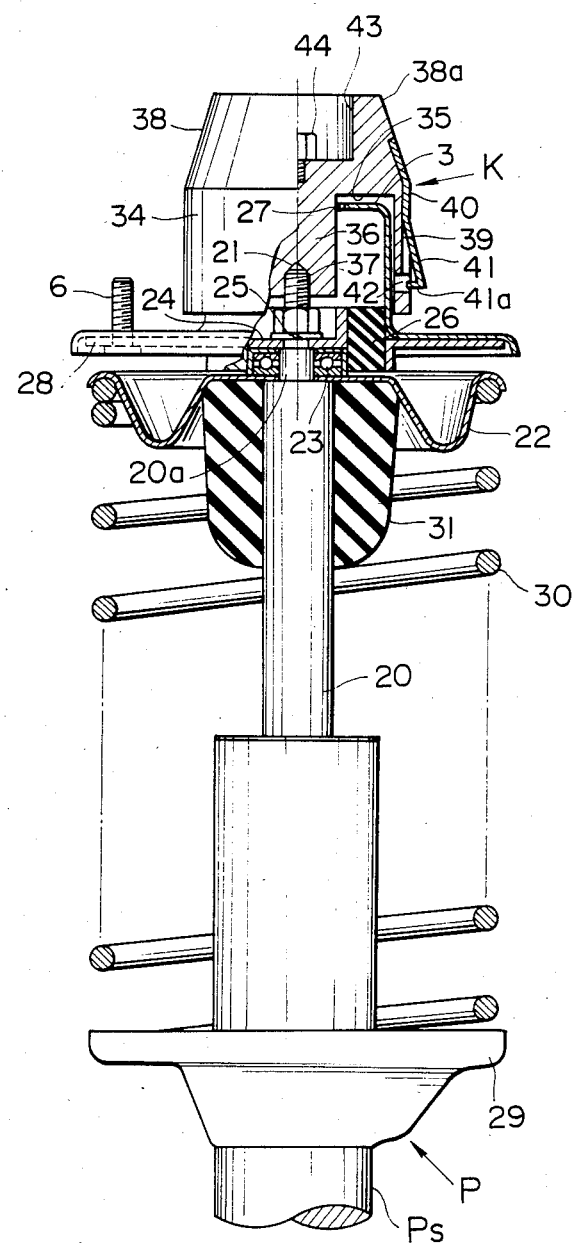
FIG. 2 is a view in partial section of a strut and engagement member temporarily attached to the strut to which the present invention is applicable.
Figure 4:
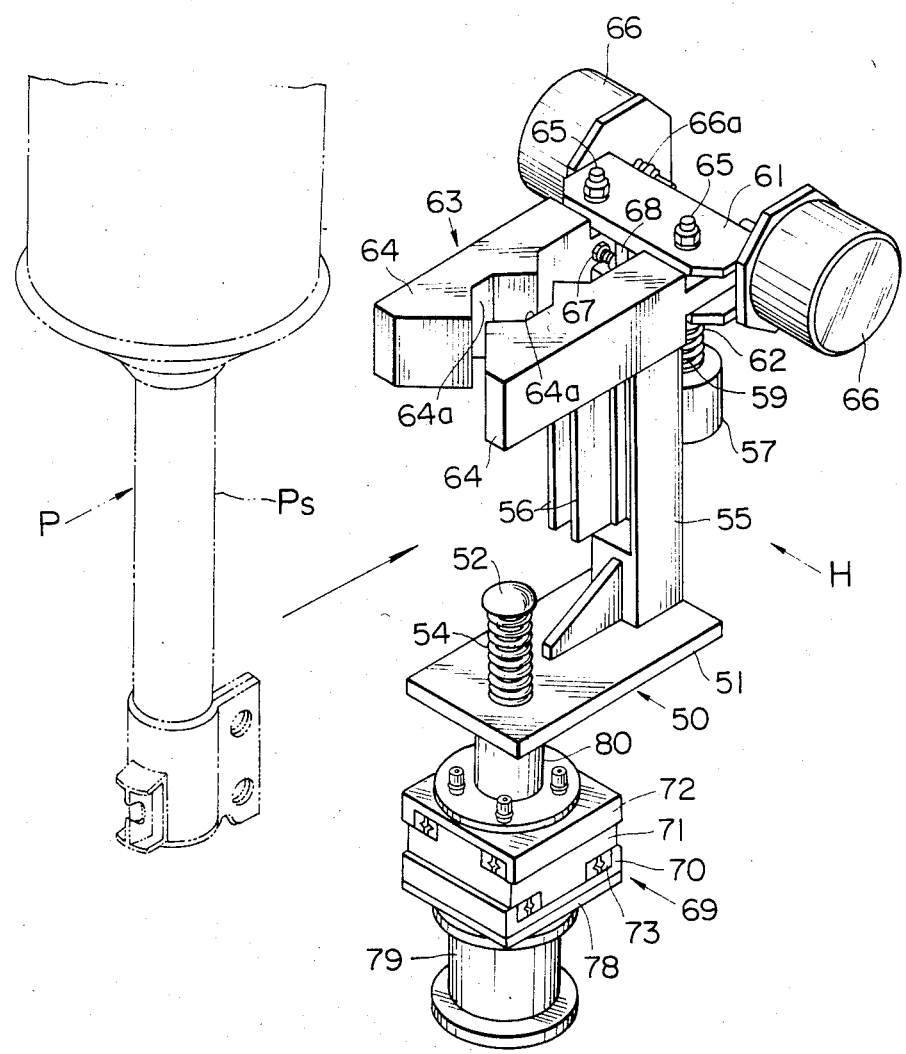
FIG. 4 is a perspective view of a preferred embodiment of a mechanical hand to which the present invention is applied.

FIG. 2 shows the internal structure of the engagement member K attached to an upper casing 3 of the strut P. FIG. 3 shows the upper position of the strut P and the engagement member K when removed from the strut P.

In this embodiment, a piston shaft 20 extending out of a piston cylinder defining the axis Ps of the strut P has an internal small-diameter shaft 20a at its free end as seen in FIG. 2. A threaded projection 21 is formed at the tip of the small-diameter shaft 20a. An upper spring plate 22 is fitted onto the small-diameter shaft 20a to serve as the upper seat of a spring 30, such as a coil spring, surrounding the upper part of the piston cylinder. The upper spring plate 22 is secured to the shaft 20a via a thrust bearing 23, a shim 24 and a nut 25 tightened onto the above-described threaded projection 21. In addition, the upper casing 3 of the strut P is in the form of an inverted cup having a radially extending flange at its open end as shown in FIG. 2 and is attached to the shim 24 via a damper 26 so as to enable reciprocation together with the piston shaft 20 with respect to the axis of the piston cylinder Ps of the strut P.

It will be appreciated from FIG. 3 that an access hole 27 at the center of the cup-shaped upper casing 3 provides easy access to the threaded projection 21 when the nut 25 is to be tightened onto the threaded projection 21. In FIG. 2, numeral 28 denotes a bolt mounting plate secured to the lower surface of the flange of the upper casing 3. Numeral 29 denotes a lower spring plate secured to the cylinder Ps of the strut P. The spring 30 thus seats between the upper and lower spring plates 22, 29 for buffering upward and downward oscillations along the axis of the strut P. Furthermore, numeral 31 denotes a rubber bushing secured to the lower surface of the upper spring plate 22. The piston shaft 20 slides freely through the rubber bushing 31 so that the bushing 31 serves as a resilient stop or bumper for the end of the cylinder Ps of the strut P.

The structure of the engagement member K attached to the upper casing 3 of a strut P such as described above will be described below with reference predominantly to FIGS. 2 and 3.

The engagement member K comprises a substantially cylindrical base 34 having a diameter designed to be slightly smaller than an opposing positioning hole 5 in the vehicle body B. An annular recess 35 is formed in a lower surface of the cylindrical base 34 into which the cylindrical portion of the bell-shaped upper casing 3 can be received. An attachment block 36 formed in the center of the recess 35 within the cylindrical base 34 fits through the access hole 27. A female-threaded hole 37 is formed in the center of the lower surface of the attachment block 36 and is engagable with the threaded projection 21 integral with the piston shaft 20. A guide portion 38 is formed at the upper end of the cylindrical base 34 having a tapered surface 38a defining a circular truncated cone shape. Vertically elongated grooves 39 are formed in the outer wall of the cylindrical base 34 and extend part-way along the guide portion 38 and are arranged radially symmetrically with respect to the center of the cylindrical base 34. The number of the vertically elongated grooves 39 is preferably three. A leaf spring in the form of an elongated strip 40 is fitted into each of the above-described grooves 39. The upper portion of each elongated strip 40 fits tightly into the upper portion of each elongated groove 39 extending along the outer wall of the guide portion 38. On the other hand, the lowest portion of each elongated strip 40 serves as a pawl 41 projecting radially outward at a predetermined angle with respect to the vertical surface of the outer wall of the cylindrical base 34. The tip 41a of each pawl 41 is bent toward the base 34 so as project into a hole 42 formed in the corresponding outer wall of the cylindrical base 34. Therefore, when some external force is applied to one of the pawls 41, the pawl 41 is depressed and the bent portion 41a is inserted into the corresponding hole 42 so that the pawl 41 is completely housed within the corresponding elongated groove 39. In addition, another recess 43 is formed in the center of the top of the guide portion 38 and a bolt 44 screwed into a female-threaded hole at the bottom of the recess 43 is provided to facilitate attachment and removal of the whole engagement member K to and from the upper casing 3 of the strut P.

Next, the structure of a mechanical hand H attached to the first robot Ra will be described in detail with reference to FIGS. 4 through 8.

Figure 6:
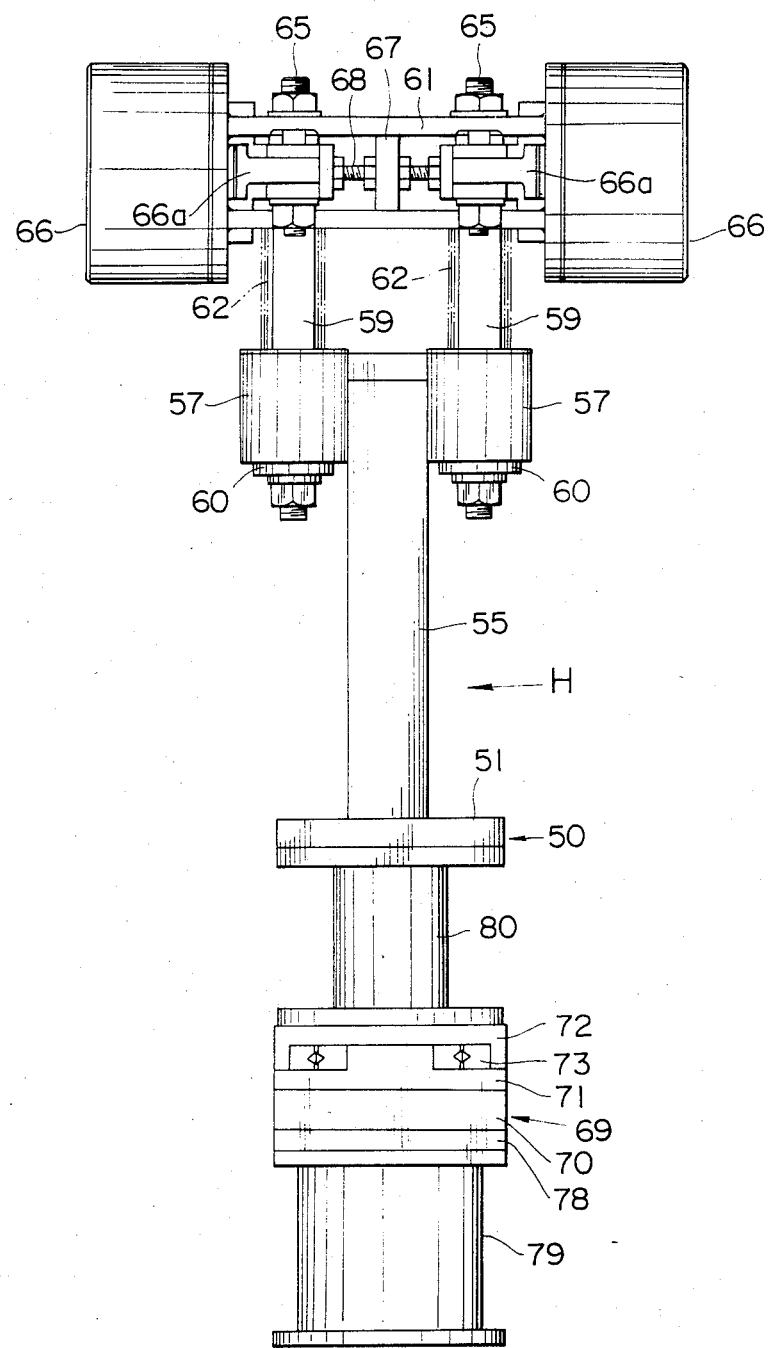
FIG. 6 is an elevation of the mechanical hand of FIG. 5.
Figure 7:
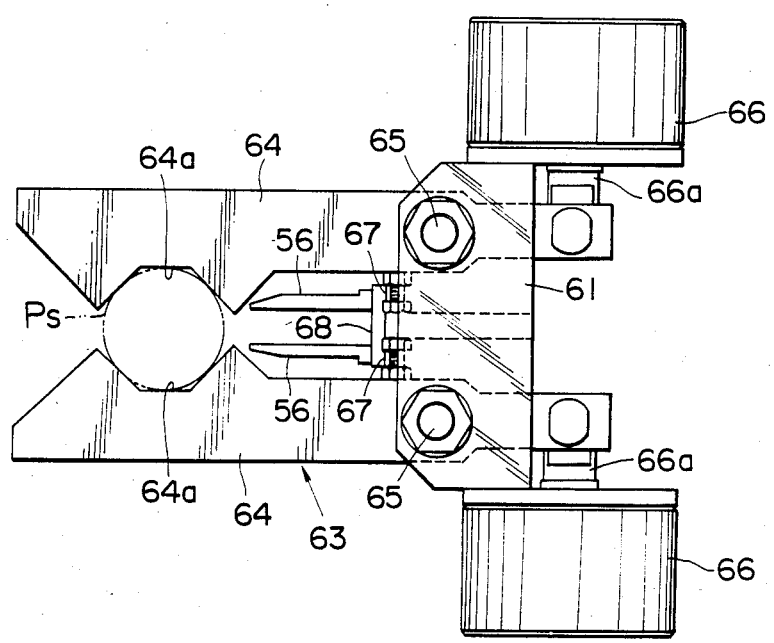
FIG. 7 is a plan view of the mechanical hand of FIGS. 4 through 6.

The mechanical hand H is roughly divided into: (a) a main frame 50; (b) a clamp member 63 which serves to grasp the cylinder Ps of the strut P; (c) a floating mechanism 69 which supports the main frame 50 on the arm 8 of the robot Ra so as to enable low-friction movement of the main frame perpendicular to the longitudinal axis of the arm 8; and (d) a lock member 81 which serves to lock the floating mechanism 69 so that the main frame 50 can be rigidly supported on the arm 8 of the robot Ra. The structure of each element of the mechanical hand H mentioned above will be described below in detail. The mechanical hand main frame 50 comprises: (a) a flat base plate 51; (b) a supporting shaft 52 inserted into a hole 51a provided substantially at the center of the base plate 51 so as to extend perpendicular to the base plate 51 and designed to slidably support one end of the strut P; (c) a lock washer 53 lockably engaging the lower end of the supporting shaft 52; and (d) a spring 54, e.g., a coil spring, seated between an upper flange 52a of the supporting shaft 52 and the upper surface of the base plate 51 for biasing the supporting shaft 52 upward with respect to the base plate 51. A nut 52b is tightened onto a threaded portion 52c projecting downward from the lower end of the supporting shaft 52 together with the washer 53. A supporting frame 55 extends upward from the base plate 51 parallel to the above supporting shaft 52. A pair of rotation-stop plates 56 extend from the supporting frame 55 above the supporting shaft 52 to sandwich a fixing bracket Pb projecting from the cylinder Ps of the strut P. In addition, a pair of cylindrical blocks 57 are mounted on either side of the upper end of the supporting frame 55, as best seen in FIG. 6. Supporting rods 59 are fitted into the cylindrical blocks 57 via ball bearings 58 so as to enable sliding in the direction parallel to the supporting frame 55. A lock washer 60 engages the lower threaded end of each supporting rod 59 together with a nut 60a. A bracket 61 of H-shaped cross-section is attached to the upper ends of the two supporting rods 59. A spring 62 is seated between the upper end of each cylindrical block 57 and the lower end of the H-shaped bracket 61 to bias the supporting rods 59 upward.

The above-described clamp member 63 comprises a pair of clamp arms 64. Each clamp arm 64 is secured between the horizontal legs of the H-shaped bracket 61 by means of a pivot axle 65 and can be pivotally opened or closed in a plane parallel to the base plate 51. Each of the clamp arms 64 has a concave recess 64a facing the recess 64a of the other clamp arm 64. The walls of each recess 64a are designed to conform to the diameter of the cylinder Ps of the strut P when the clamp arms 64 are closed in order to clamp the cylinder Ps of the strut P. In addition, a pair of pneumatic cylinders 66 are attached to opposite ends of the H-shaped bracket 61 for actuating the clamp arms 64. A piston rod 66a of each pneumatic cylinder 66 projects out of the corresponding pneumatic cylinder 66 and is linked to the base end of the corresponding clamp arm 64 outside of the pivot axle 65. It should be noted that a stopper assembly 67 projects from the inside surface of each of the clamp arms 64 in the vicinity of the pivot axle 65 so as to oppose the other stopper assembly 67 of the other clamp arm 64. The stopper assembly 67 and a vertical stop plate 68 integrally formed with the bracket 61 serve to limit the angular approach of the clamp arms 64 and thereby prevent the clamp arms from moving too close together.

In addition, the above-mentioned floating mechanism 69 is interposed between the arm 8 of the robot Ra and the base plate 51 of the mechanical hand main frame 50, as seen from FIGS. 4 through 6 and FIG. 8. The floating mechanism 69 comprises: (a) a fixed bed 70; (b) a sliding plate member 71 mounted on the fixed bed 70 so as to be able to slide in a predetermined direction (X direction in FIG. 8); and (c) a movable bed 72 mounted on the sliding plate member 71 so as to be able to slide in a predetermined direction orthogonal to the sliding direction of the sliding plate member 71 (Y direction in FIG. 8).

The fixed bed 70 is a rectangular plate with shallow walls along two opposite sides defining a recess 70a extending in the X-direction. The sliding plate member 71 is also a rectangular plate but has a wide, shallow central runner 71a extending in the X-direction along its lower surface. The runner 71a slidably engages the walls of the recess 70a via a pair of bearings 73 along both of its longitudinal sides. Each of the bearings 73 comprises: an outer casing 74 fixed to the longitudinal wall of the recess 70a; an inner casing 75 fixed to the longitudinal wall of the runner 71a; a plurality of cylindrical rollers 76 arranged so that axial directions of the cylindrical rollers 76 are changed alternatingly within V-shaped grooves 74a and 75a formed in each of the outer casings 74 and inner casings 75; and elongated plates 77, each of which rotatably supports the rollers 76 at predetermined intervals. The movable bed 72 is a rectangular plate similar to the fixed bed 70 but with its recess 72a on its lower surface and aligned along the Y direction. A second runner 71b is formed on the upper surface of the sliding member 71 and extends in the Y direction. The runner 71b slidably engages the recess 72a via the pair of bearings 73 inserted between the walls of the recess 72a and the sides of the runner 71b. Therefore, the movable bed 72 can move in both the X- and Y-directions with respect to the fixed bed 70. As a result, the movable bed 72 can be directed to move to an arbitrary position in the plane parallel to the general plane of the fixed bed 70, i.e., X-Y plane defined by the X- and Y-axes. In addition, a flat plate 78 is fixed to the lower surface of the fixed bed 70 by means of threaded engagement. The flat plate 78 is linked with the arm 8 of the robot Ra via a tubular linkage bracket 79. On the other hand, the movable bed 72 is linked with the base plate 51 of the main frame 50 via another tubular linkage bracket 80.

Figure 5:
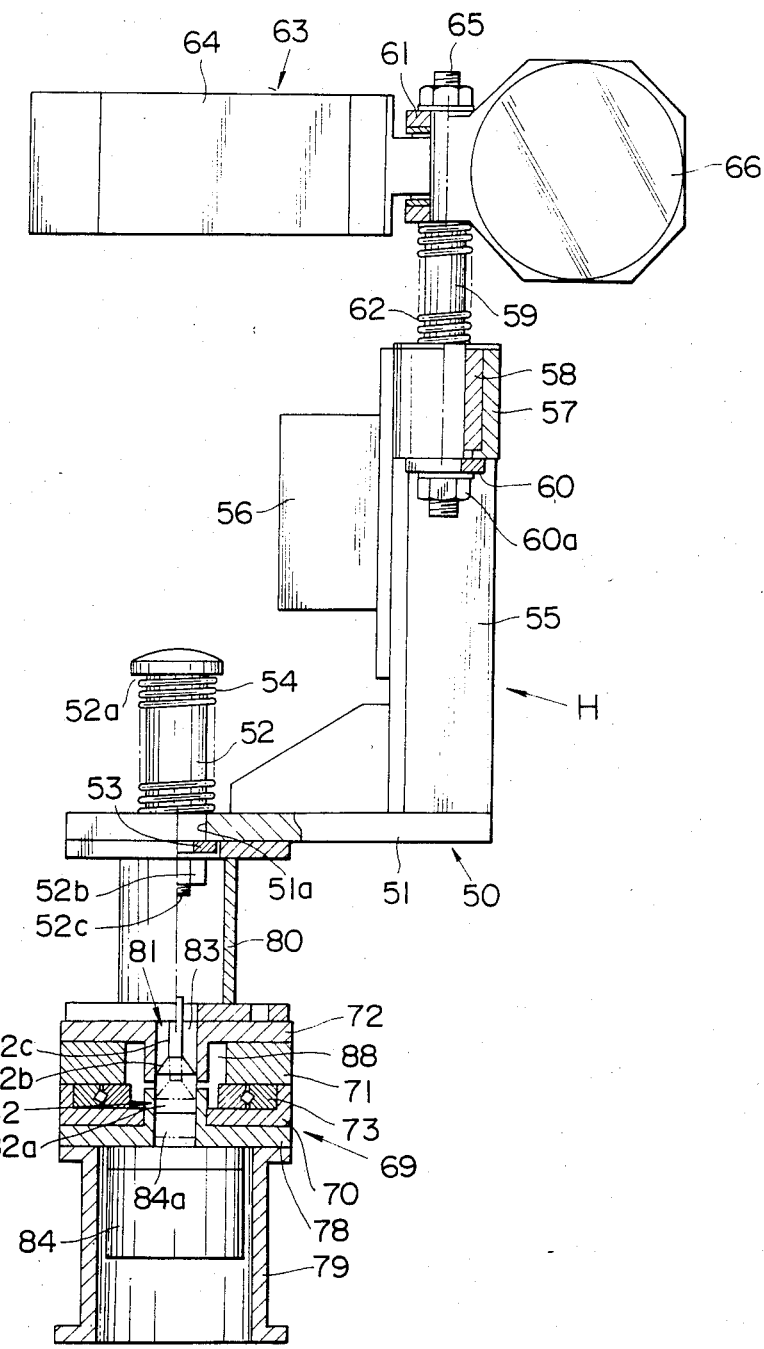
FIG. 5 is an elevation in partial section of the mechanical hand shown in FIG. 4.
Figure 8:
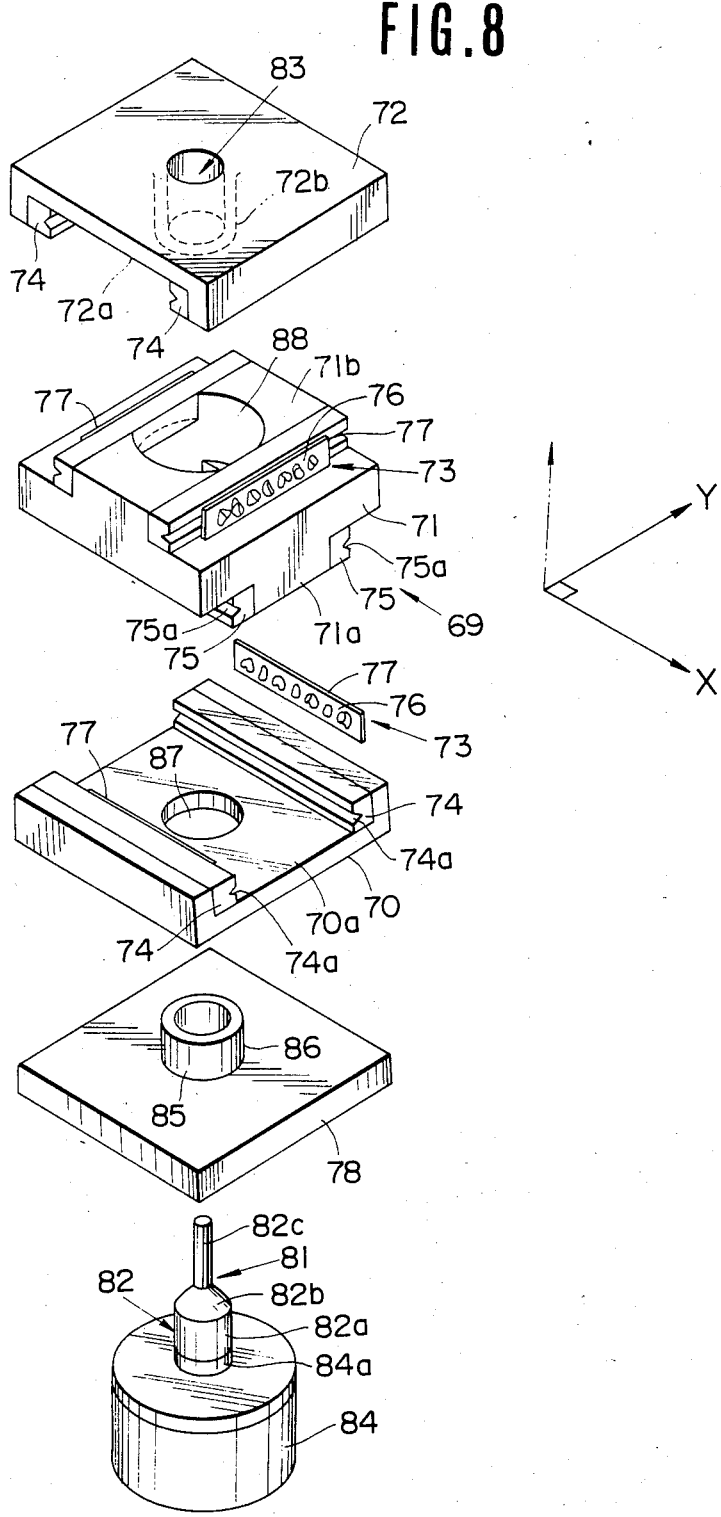
FIG. 8 is an exploded perspective view showing the internal structure of the floating mechanism and the lock member of the mechanical hand.

The aforementioned lock member 81 comprises a lock pin 82 passes through a hole in the center of the fixed bed 70 and through a lock hole 83 in the center of the movable bed 72, as seen in FIGS. 5 and 8. The lock pin 82 comprises: a large-diameter cylindrical section 82a; a circular truncated cone section 82b located on the large-diameter cylindrical section 82a; and a small-diameter cylindrical section 82c formed at the tip of the circular truncated cone section 82b. The lock pin 82 is fixed to a piston rod 84a of a pneumatic cylinder 84 fixed to the lower surface of the flat plate 78 and centered under a hole 85 through the flat plate 78. A guide envelope 86 is integrally formed around the hole 85 and extends upward so that the large-diameter cylindrical section 82a is in slidable contact therewith. The guide envelope 86 in turn passes through the hole 87 in the center of the fixed bed 70. A hole 88 substantially in the center of the above-described sliding member 71 has a larger diameter than an outer diameter of the guide envelope 86 and penetrates through both runners 71a, 71b. The lock hole 83 penetrates through a projection 72b extending downward from the center of the lower surface of the movable bed 72 and having a smaller diameter than the hole 88. When the lock pin 82 is pulled downward by means of the piston rod 84a, the small-diameter section 82c described above projects loosely into the lock hole 83. On the other hand, when the lock pin 82 is pushed upward by means of the piston rod 84a, the above-described circular truncated cone section 82b is moved so as to slide along the peripheral wall toward the center of the lock hole 83, so that the large-diameter cylindrical section 82a is moved into tight contact with the lock hole 83.

Next, the structure of both the automatic nut fastening tool N and the supporting apparatus S connecting the nut fastening tool N to arm 9 of the robot Rb will be described with reference to FIGS. 9 through 13.

Figure 9:
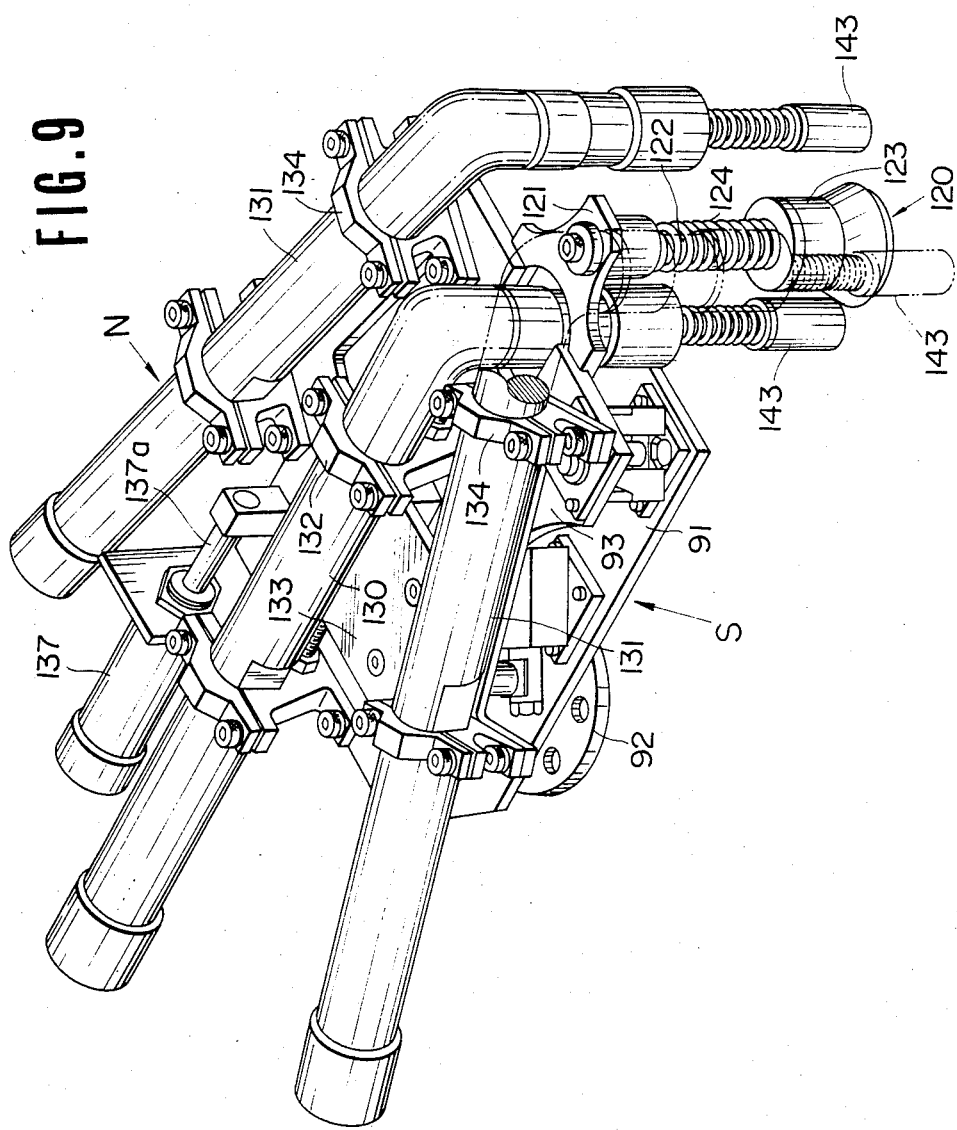
FIG. 9 is a perspective view of an example of a supporting apparatus for an automatic (nut) fastening tool.
Figure 13:
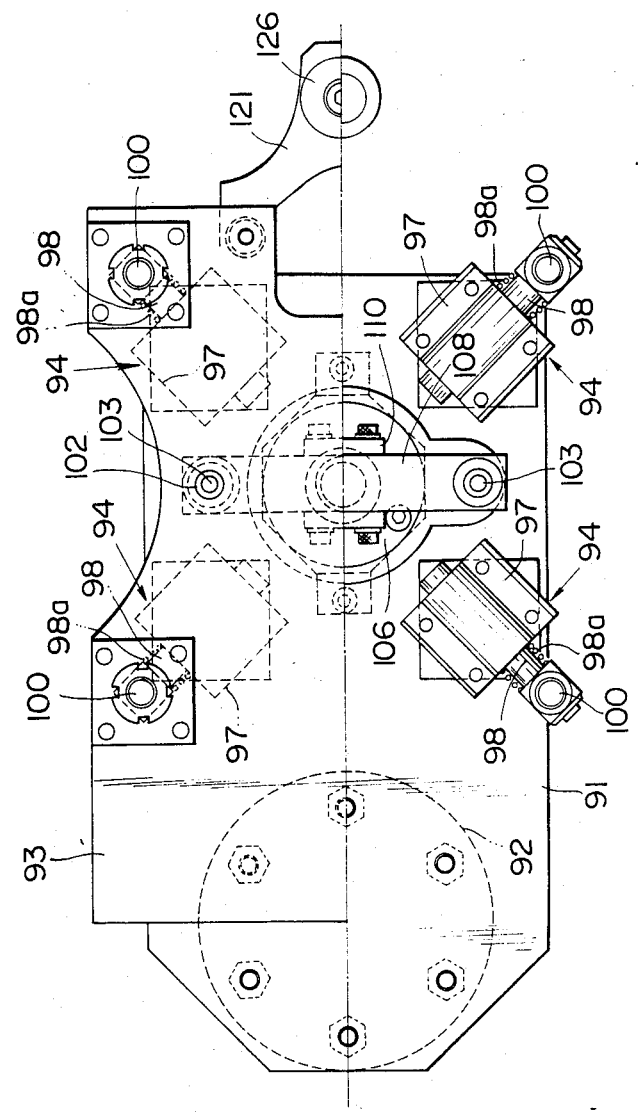
FIG. 13 is a view taken along the line XIII—XIII in FIG. 10.

The supporting apparatus S comprises: (a) a flat base plate 91 fixed to the arm 9 of the robot Rb; (b) a flat movable plate 93 supported by the base plate 91 so as to be freely movable and so that when the supporting apparatus S is moved to a surface of the vehicle body B to which the strut P is to be attached (i.e., the upper surface of the strut tower 4), the plane of the movable plate 93 is parallel to that of the upper surface of the strut tower 4 and to which the nut fastening tool N is fixed; (c) a positioning member 101 interposed between the base plate 91 and movable plate 93 for moving the movable plate 93 with respect to the base plate 91 to a normal state position to be described later; and (d) a guide member 120 on the movable plate 93 for guiding the nut fastening tool N toward a predetermined position on the vehicle body B, the predetermined position being described later. A bracket 92 with a substantially I-shaped cross-section is attached to the lower surface of the base plate 91 so that the base plate 91 is linked to the arm 9 of the robot Rb. The supporting apparatus further comprises floating mechanisms 94, the structure of which will be described later, interposed between the base plate 91 and the movable plate 93. The floating mechanisms 94 support the four corners of the movable plate 93, as best seen in FIGS. 9 and 13. Each floating mechanism 94 comprises: (a) a rotating shaft 96 fitted into a hole 91a via a bearing 95, the rotating shaft 96 being perpendicular to the base plate 91; (b) a casing 97 fixed to one end of the rotating shaft 96; (c) a sliding shaft 98 which slides within the casing 97 in a plane parallel to the base plate 91; and (d) a linkage shaft 100, one end of which is fixed to one end of the sliding shaft 98 and the other end of which is fitted into a hole 93a in the movable plate 93. The above-described movable plate 93 can thus be translated arbitrarily through the plane parallel to the base plate 91. A coil spring 98a is wound around each sliding shaft 98 to provide a centering action when the nut fastening tool N is tilted with respect to the movable plate 93, the biasing force thereof being adjusted to allow for the weight of the movable plate 93.

The aforementioned positioning member 101 comprises: (a) a pair of locating holes 102 on opposite sides of the positioning member 101 as viewed in FIG. 11, each being countersunk to flare toward the base plate 91; and (b) a pair of locating pins 103 opposing the locating holes 102 and having a frusto-conical shape, which tightly fit into the corresponding locating holes 102. In addition a pneumatic cylinder 106 is attached to the center of the upper surface of the base plate 91 via a bracket 104 fastened to the base plate 91 by means of a fastener such as a bolt 105. A piston rod 106a projects upward out of the pneumatic cylinder 106. A supporting plate 108 to which the pair of locating pins 103 are fixed extends horizontally from an adaptor 107 attached to the free end of the piston rod 106a. The adaptor 107 fits slidably into a guide bracket 109 having a substantially cylindrical shape and fixed to the pneumatic cylinder 106. Rotation-stop plates 110 fixed to the front and rear sides of the supporting plate 108 as viewed in FIG. 11 fit tightly over the guide bracket 109. Since the rotation-stop plates 110 are in contact with flat contact surfaces 109a cut into the front and rear sides of the guide bracket 109, the supporting plate 108 is thus constrained to move straight upward and downward without rotational movement. The pair of locating pins 103 thus serve to guide upward and downward reciprocation at the two points corresponding to the pair of locating holes 102 according to the movement of the piston rod 106a. Each of the locating pins 103 comprises in addition a cylindrical shaft projecting from its frusto-conical section. When the piston rod 106a of the pneumatic cylinder 106 is moved upward by the pneumatic cylinder 106, the locating pins 103 fit tightly into the corresponding locating holes 102 so that the movable plate 93 is held in its normal position mentioned above with respect to the base plate 91. On the other hand, when the piston rod 106a is moved downward by the pneumatic cylinder 106, the cylindrical shafts of the locating pins 103 fit loosely into the locating holes 102 so that the movable plate 93 is free to shift within the range of clearance between each locating pin 103 and locating hole 102. It should be noted that a pair of adjusting assemblies 111 provided in the above-described supporting plate 108 adjustably contact the movable plate 93 so that the relative vertical positions of the locating pins 103 and the locating holes 102 can be suitably adjusted.

In addition, the aforementioned guide member 120 comprises: (a) a sliding shaft 122 attached to an extension of the movable plate 93 via a bracket 121 and which can slide in a direction perpendicular to the movable plate 93; (b) a guide block 123 attached to the lower end of the sliding shaft 122; and (c) a spring 124 seated between the guide block 123 and the bracket 121 which biases the abovedescribed guide block 123 downward. A guide recess 125 is formed in the lower surface of the guide block 123 and is designed to fit tightly over the guide portion 38 of the engagement member K attached to the strut P in such a way that the center of the guide block 123 conforms to that of the engagement member K. The nut fastening tool N can thus be positioned accurately in a predetermined relationship to the vehicle body B after the guide member 120 has engaged the guide portion 38 of the engagement member K. A lock washer 126 is attached to the upper end of the sliding shaft 122.

Figure 10:
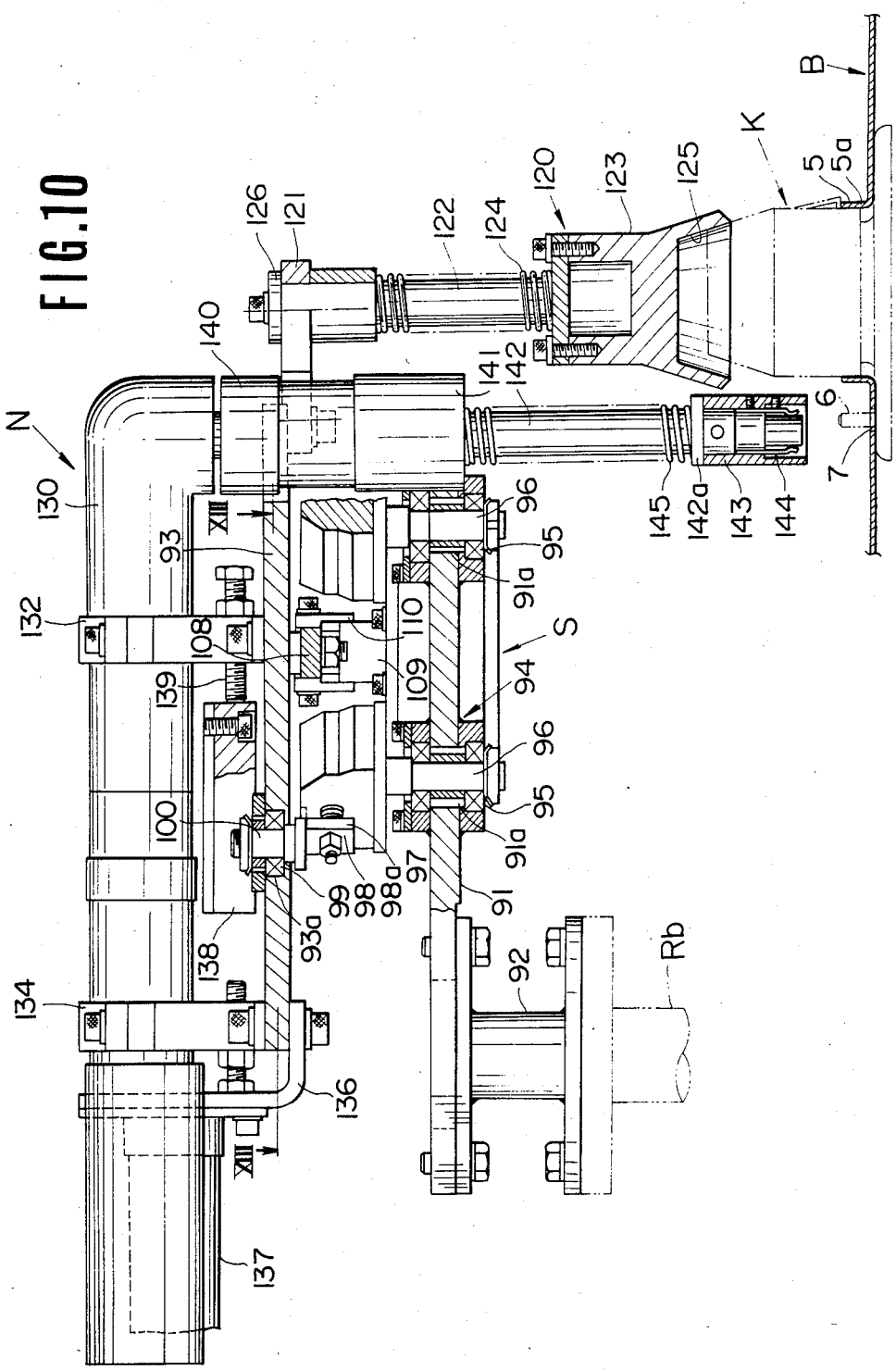
FIG. 10 is an elevation in partial section of the supporting apparatus shown in FIG. 9.

The nut fastening tool N is provided to tighten a fixed number of nuts onto the bolts 6 projecting through bolt-inserting holes 7 in the vehicle body B, as can be appreciated from FIGS. 9 and 10. The nut fastening tool N comprises a stationary-type nut runner 130 and a pair of movable-type nut runners 131. While the stationary nut runner 130 is mounted directly on the movable plate 93 via a bracket 132, the movable nut runners 131, 131 are arranged symmetrically with respect to the stationary nut runner 131 and slightly oblique to its axial direction. The movable nut runners 131 are fixed to a slidable plate 133 via holding brackets 134, the slidable plate 133 being reciprocable in the direction parallel to the axis of the stationary nut runner 131. A slide mechanism 135 of the slidable plate 133 comprises: (a) an inner casing 135a fixed to the movable plate 93; and (b) an outer casing 135b slidably engaging the outer casing 135a and fixed to the slidable plate 133. The slidable plate 133 is linked to a piston rod 137a of a pneumatic cylinder 137 attached to the movable plate 93 via a bracket 136 so that the slidable plate 133 moves in accordance with the movement of the piston rod 137a. A stopper plate 138 fixed to the lower surface of the slidable plate 133 is designed to abut adjustable stop dogs 139 in order to adjustably define the range of travel of the slidable plate 133. Thus, the movable nut runners 131 can be moved to either of the stop positions of the slidable plate 133 so that the positions of the nut runners 131 can accord with those of the bolt-inserting holes 7, which may change depending on the vehicle model.

Figure 12:
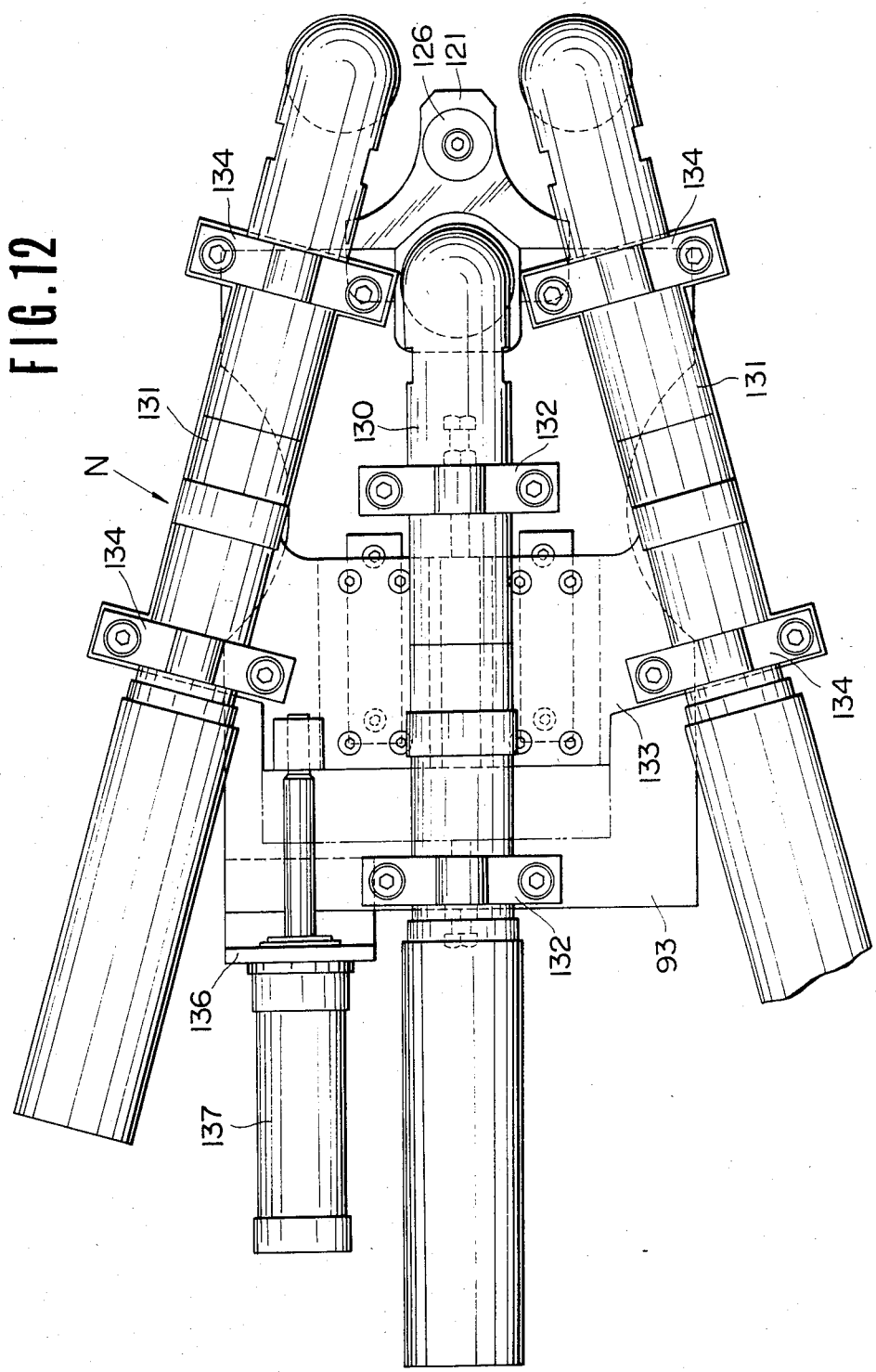
FIG. 12 is a plan view of the supporting apparatus shown in FIGS. 9 through 11.

In this embodiment, the pair of nut runners 131 may be disposed as shown in FIG. 12. The nut fastening operation may alternatively be carried out using only the movable-type nut runners 131.

A coupling 140 is fixed to the pivotal axis of each of the stationary and movable nut runners 130, 131 as shown in FIG. 10. A joint 141 is fixed to the lower end of the coupling 140. A linkage shaft 142 is attached through holes in the coupling 140 and the associated joint 141 so that the linkage shaft 142 is slidable only vertically, not rotatably. A nut-holding socket 143 is fitted to a lower end of the linkage shaft 142 and a leaf spring 144 is provided within the socket 143 in contact with a nut held within the socket 143. A spring 145 is seated between a flange 142a provided at the lower end of the the joint 141 and the lower end of the joint 141 so that the linkage shaft 142 is always biased downward.

Next, the process of automatically attaching the strut P to the vehicle body B using the automatic attachment system of the preferred embodiment described above in the vehicle assembly line will be described with reference to FIG. 1 and FIGS. 16 through 26(C).

It will be seen from FIG. 1 that in the first stage the first robot Ra moves the arm 8 to actuate the mechanical hand H to grasp one of the struts P from the bin 2 and thereafter moves the arm 8 toward the conveyer belt 1, the strut P being carried together with the mechanical hand H attached to the arm 8, and waits for a vehicle body B to arrive at the first working station $ST_1$. At this time, the first robot Ra stops at a position in which the strut P, the mechanical hand H, and the arm 8 do not interfer with the vehicle body B.

It should be noted that the engagement members K have previously been attached to the individual struts P stored in the bin 2 by screwing the female threaded portion of each engagement member K into the threaded projection 21 provided at the tip of the piston shaft 20 of each strut P.

Figure 26A:
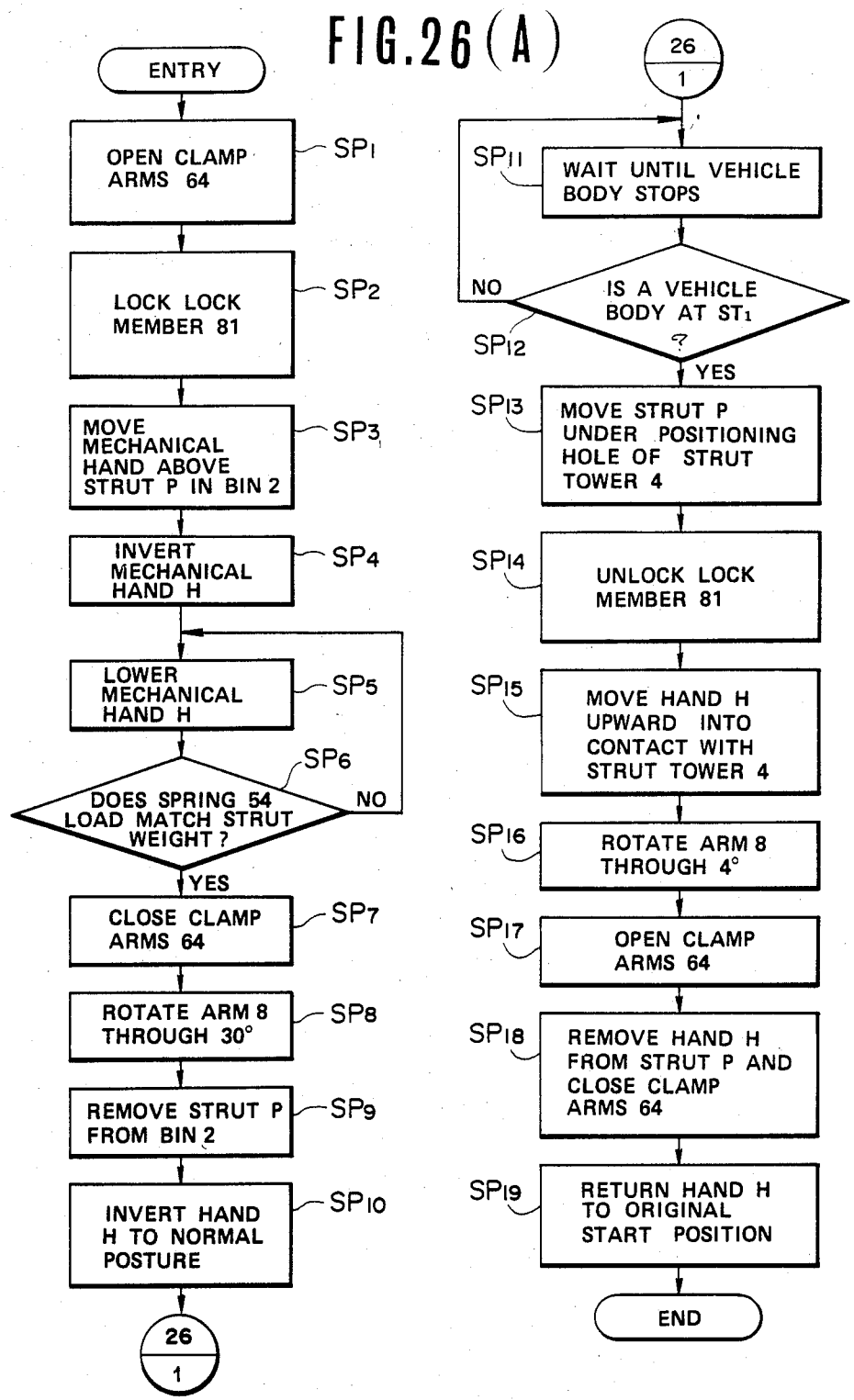
FIG. 26(A) is an operational flowchart for a process of detachably attaching a strut to a strut tower of the vehicle body by means of a first robot Ra.
Figure 26B:
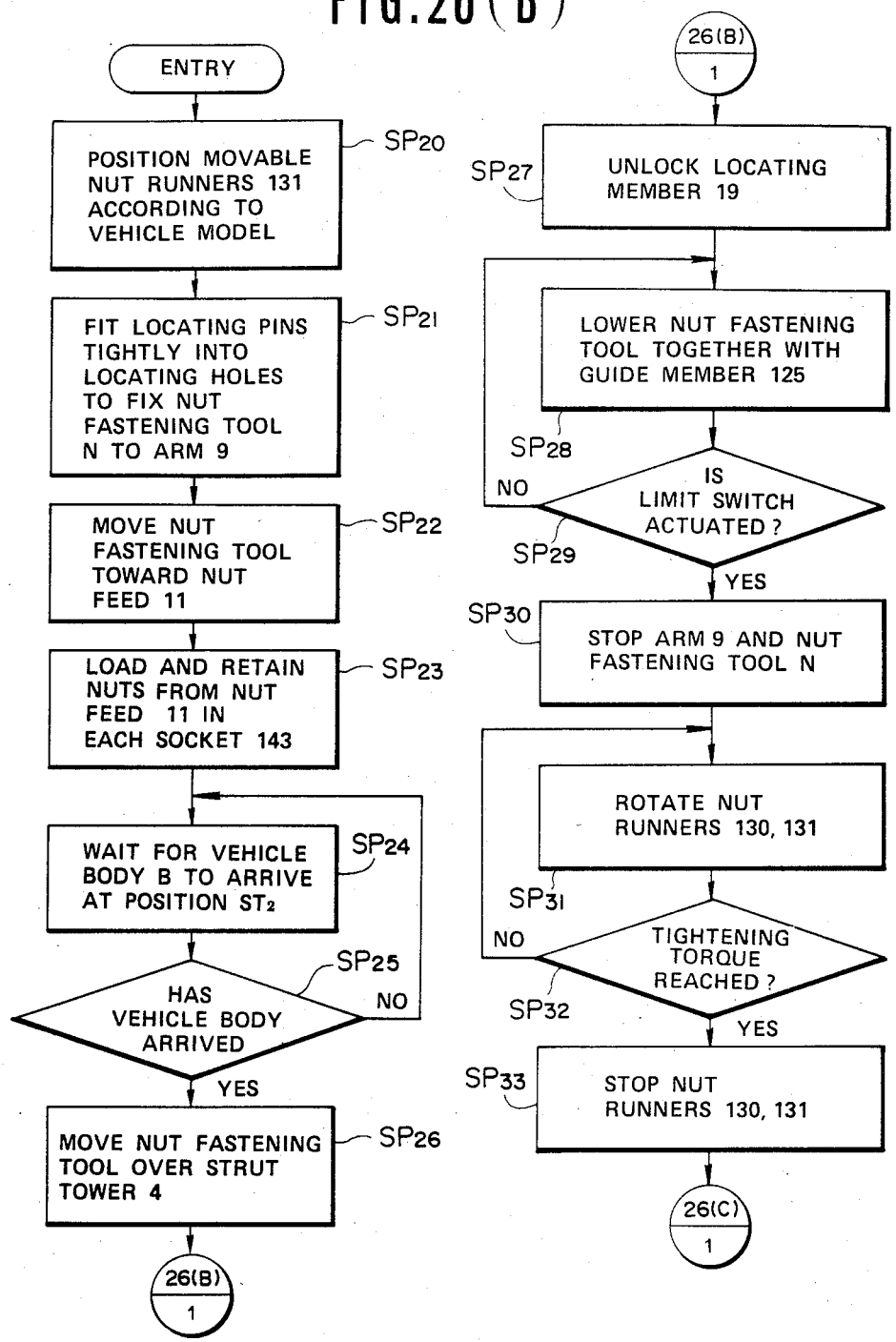
FIGS. 26(B) and (C) form an operational flowchart for a process, subsequent to that shown in FIGS. 26(A) and (B), of tightening nuts onto respectively opposing bolts extended through the strut and penetrated through corresponding opposing holes provided around the strut tower of the vehicle body by means of a second robot Rb.
Figure 26C:
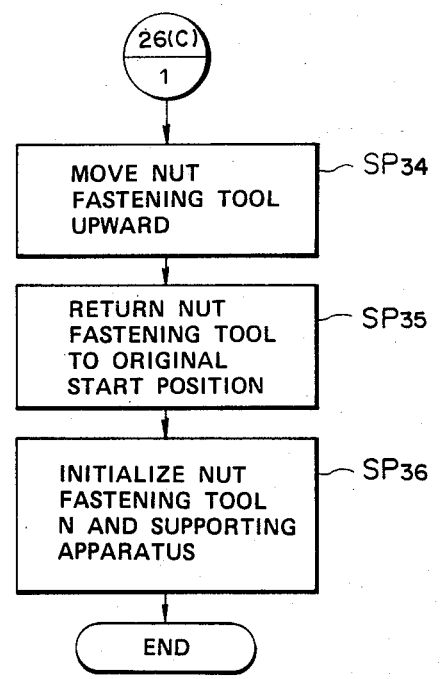

In more detail, in a first step $SP_1$ shown in FIG. 26(A) a command signal issued by a control unit (not shown) actuates each pneumatic cylinder 66 to extend the corresponding piston rod 66a by means of positive pneumatic power so that the clamp arms 64 are opened. In a second step $SP_2$, the pneumatic cylinder 84 is also actu- ated such that the lock member 81 is locked. In more detail, the lock pin 82 is moved accordingly upward with respect to the fixed bed 70 so that the large-diameter portion 82a of the lock pin 82 fits tightly into the lock hole 83. Thus, the movable bed 72 constituting the floating mechanism 69 is fixed to the fixed bed 70 so that the floating mechanism 69 follows the movement of the fixed bed 70. Consequently, the mechanical hand main body 50 is firmly fixed to the arm 8 of the first robot Ra. Upon completion of this preparation, in a third step $SP_3$ the first robot Ra actuates the arm 8 to move the mechanical hand H above one of the desired struts P stored in the bin 2 and, in a fourth step $SP_4$, the first robot Ra turns the arm 8 to invert the mechanical hand H so that the clamp arms 64 face downward. Thereafter, in a fifth step $SP_5$ the first robot Ra actuates the arm 8 to move the mechanical hand H downward until the supporting shaft 52 is brought into contact with the bottom of the desired strut P and the compression force on the spring 54 around the shaft 52 is balanced by the weight of the desired strut P, as determined in a sixth step $SP_6$.

In a seventh step $SP_7$, a subsequent command signal from the control unit actuates the pneumatic cylinder chamber 66 to return the piston rod 66a to its rest position. Thus, the opened clamp arms 66 are pivoted inward so that the contact portions 64a of the clamp arms 64 are brought in contact with the cylinder Ps of the strut P. Consequently, the strut P is tightly grasped by the clamp member 63.

The arm 8 of the first robot Ra is then rotated around its vertical axis through a predetermined angle, e.g., 30 degrees, in a step $SP_9$. This step serves to angularly position both the bolts 6 of the upper casing 3 and the strut bracket Pb, as will be clear from the following explanation. The base of the bin 2 has a number of arcuate positioning slits 150 through which the bolts 6 pass. Thus, as the strut P pivots about its axis, the bolts 6 are also pivotted through the slits 150 until they simultaneously abut the ends of the corresponding slits 150. Thereafter, the cylinder Ps continues to pivot while the upper casing 3 and piston rod 20 remain stationary. The angular extent of this pivotting step is chosen to be sufficient to move both the bracket Pb and the bolts 6 to their respective working positions.

In a ninth step $SP_9$, the first robot Ra removes the strut P from the bin 2 and then carries the strut P toward the first working station $ST_2$ on the conveyer belt 1, changing its posture in a tenth step $SP_{10}$ opposite in sense to step $SP_4$ in order to return the engagement member K and upper casing 3 of the strut P to the upright position.

Figure 14:
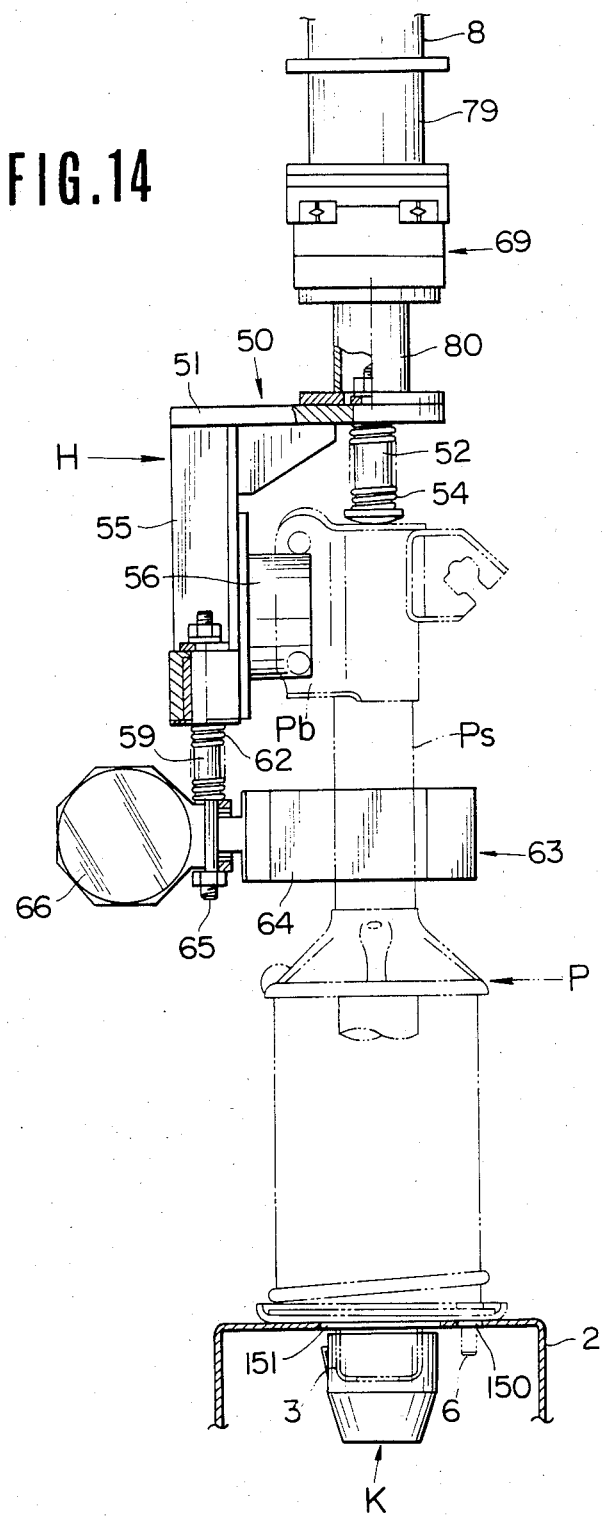
FIG. 14 is an elevation of the mechanical hand and a strut disposed in a bin shown in FIG. 1 showing the step of grasping the strut in the bin by means of the inverted mechanical hand.

It should be noted that in FIG. 14 numeral 151 denotes a receiving hole provided at the bin 2 for accommodating the upper casing 3 and the engagement member K and in FIG. 1 numeral 152 denotes a clip positioned directly above the receiving hole 151 for retaining the axle Ps of the strut P.

Figure 15:
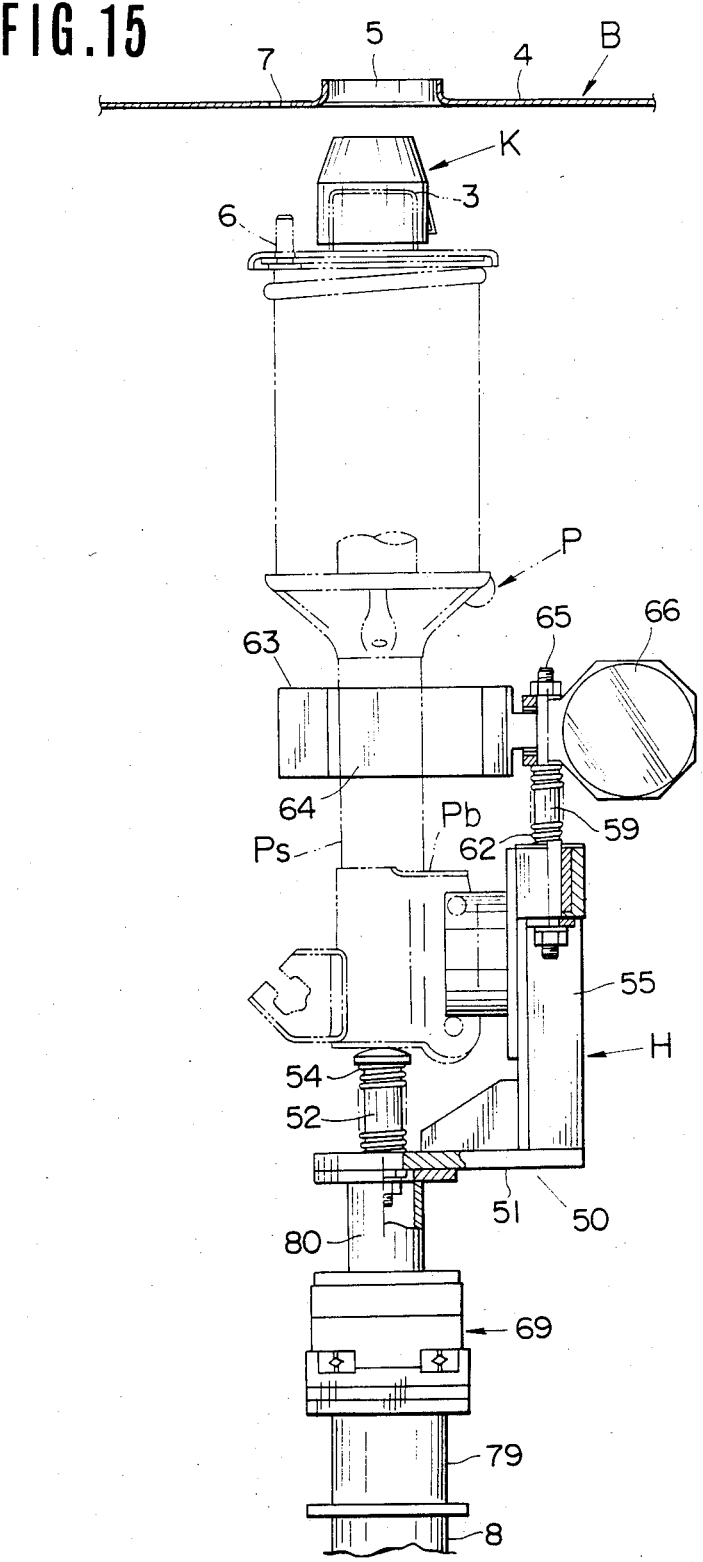
FIG. 15 is an elevation of the strut and a vehicle body showing the positional relationship between the strut and the vehicle body before the strut is attached to a strut tower of the vehicle body.
Figure 17:
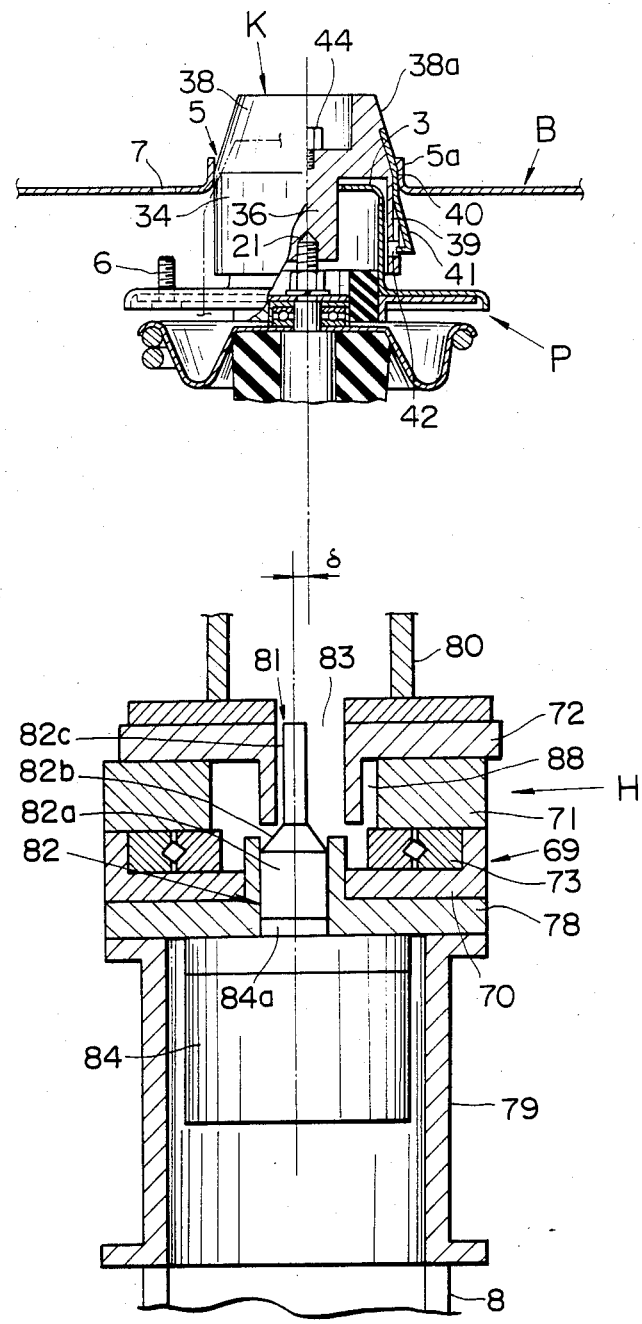
FIG. 17 is an elevation in partial section of essential parts of the strut and the engagement member showing the step, subsequent to that shown in FIG. 16, of inserting the engagement member into the positioning hole of the vehicle body.

A completion signal is issued by the control unit when the vehicle body B transported by the conveyer belt 1 has stopped at the predetermined position of the first working station $ST_1$. In steps 11 and 12, the first robot waits without moving until it receives the completion signal. In a step $SP_{13}$, the first robot Ra, in response to the completion signal, moves the strut P to a point below the strut tower 4 of the stopped vehicle body B and stops so that the bolts 6 extending from the upper casing 3 face the lower surface of the strut tower 4, as shown in FIG. 15. At this time, since the mechanical hand H is fixedly linked to the robot Ra and the strut P is tightly grasped by the clamp member 63, the strut P will not shift relative to the arm 8. Although the strut P can thus be positioned substantially opposite the positioning hole 5 of the vehicle body B theoretically, the vertical axis of the strut P may not coincide with the center of the positioning hole 5, i.e., the vertical axes thereof may deviate slightly either forward or rearward in the direction parallel to the conveyer belt 1 on which the vehicle body B is mounted. This is because the accuracy of the stop position of the vehicle body B is lower than that of the operation of the robot.

In a step $SP_{14}$, a control signal issued by the control unit (not shown) causes the lock member 81 to be unlocked as shown schematically in FIG. 16. In more detail, when the piston rod 84a of the pneumatic cylinder 84 is withdrawn, the lock pin 82 is accordingly moved downward from its locked position indicated by the solid lines in FIG. 16 to its unlocked position indicated by phantom lines. Consequently, the small-diameter portion 82c of the lock pin 82 fits loosely within the lock hole 83. Therefore, the movable bed 72 of the floating mechanism 69 becomes free to move within the X-Y plane with respect to the fixed bed 70 through the range of clearance between the lock pin 82 and lock hole 83. Consequently, the mechanical hand main body 50 is supported by the robot Ra, with the mechanical hand main body 50 being free to shift within the plane of the movable bed 72. In a step $SP_{15}$, the first robot Ra raises the strut P. During this step, the guide portion 38 of the engagement member K may come into contact with the periphery of the positioning hole 5 of the vehicle body B as indicated by the phantom lines in FIG. 17. The guide portion 38 of the engagement member K will eventually fit into the positioning hole 5 of the vehicle body B since the guide tapered surface 38a of the guide portion 38 slides along the edges of the positioning hole 5 as indicated by the solid line in FIG. 17 and the vertical axis of the guide portion 38 will accordingly be shifted into agreement with the center of the positioning hold 5. In this case, the movement of the engagement member K is transmitted to the floating mechanism 69 via the upper casing 3, the clamp member 63, and the mechanical hand 50. However, since the movable bed 72 of the floating mechanism 69 can shift freely along the plane of the movable bed 72 through the distance indicated by δ in FIG. 17 and FIG. 18, the entire mechanical hand main body 50 is moved along the plane of the movable bed 72. Consequently, the strut P moves with the engagement member K while maintaining its normal upright posture with respect to the arm of the robot Ra.

Figure 18:
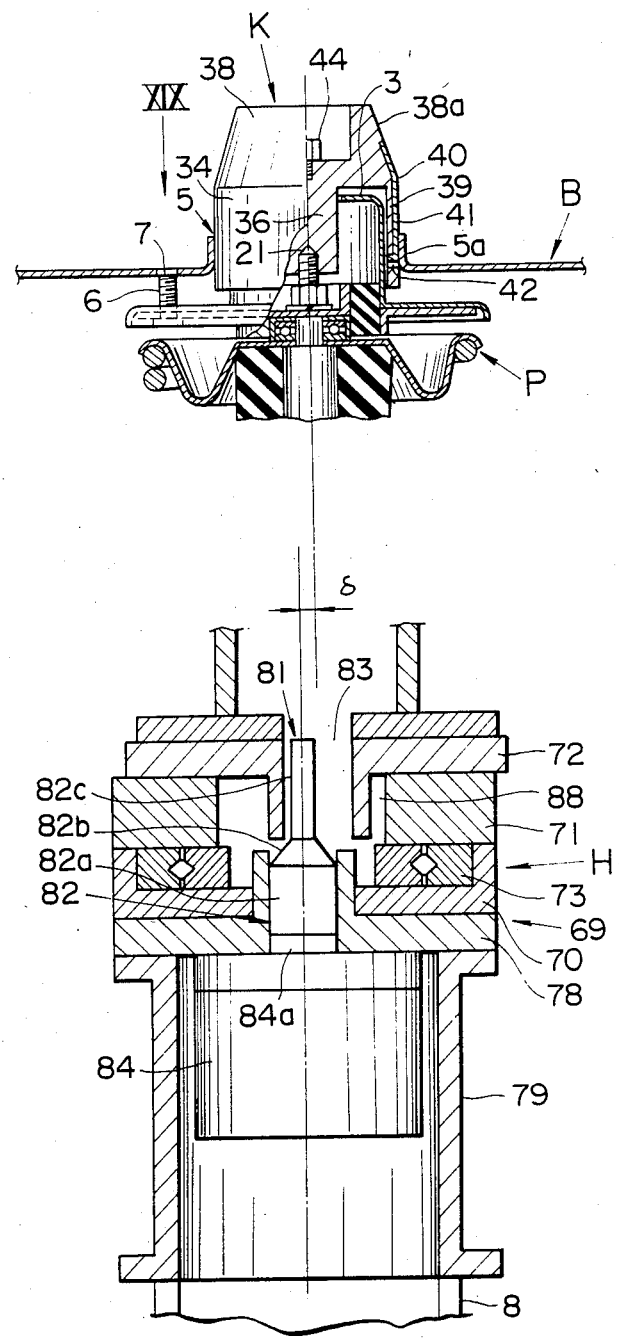
FIG. 18 is an elevation in partial section of essential parts of the engagement member, the strut, and the mechanical hand showing the step subsequent to that shown in FIG. 17 in which a bolt is moved into contact with the vehicle body.
Figure 19:
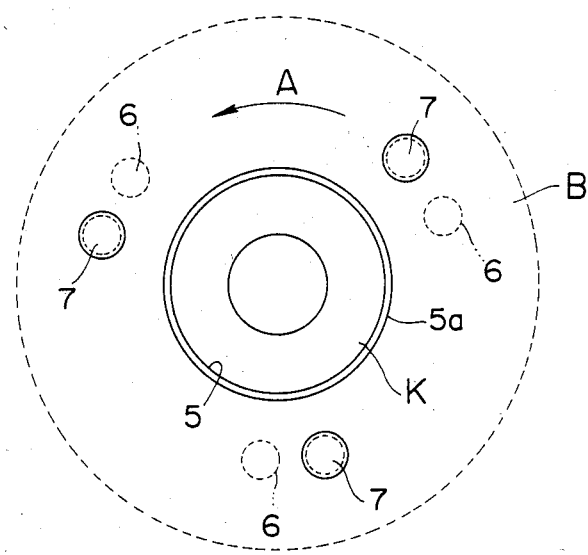
FIG. 19 is a plan view of the strut tower and the engagement member showing a step subsequent to that shown in FIG. 18 in which the strut as viewed in the direction XIX of FIG. 18 and as rotated by means of an arm.

During this time, the first robot Ra continues to raise the strut P further so that, as shown in FIG. 18, the engagement pawls 41 are depressed into the corresponding vertically elongated grooves 39 of the cylindrical base 34 due to elastic contact with the internal walls of a flange 5a formed around the edges of the positioning hole 5. As described previously, the engagement pawls 41 of the respective elongated strips 40 normally project radially outward from the cylindrical base 34.

The angular position of each bolt 6 extending from the strut P is set to deviate from that of the corresponding hole 7 of the vehicle body B by an angle of, e.g., two degrees so that the ends of the bolts 6 are brought in contact with the lower surface of the strut tower 4. In this state, since further upward movement of the strut P is blocked by the vehicle body B, the strut P itself does not move upward and both the supporting shaft 52 and the supporting rod 59 of the mechanical hand main frame 50 are depressed against the biasing forces of the corresponding springs 54 and 62. Consequently, the bolts 6 of the strut P press against the lower surface of the strut tower 4 in response to the above biasing forces.

In a step $SP_{16}$, the axis of the arm 8 is rotated through a predetermined angle, e.g., four degrees.

Figure 20:
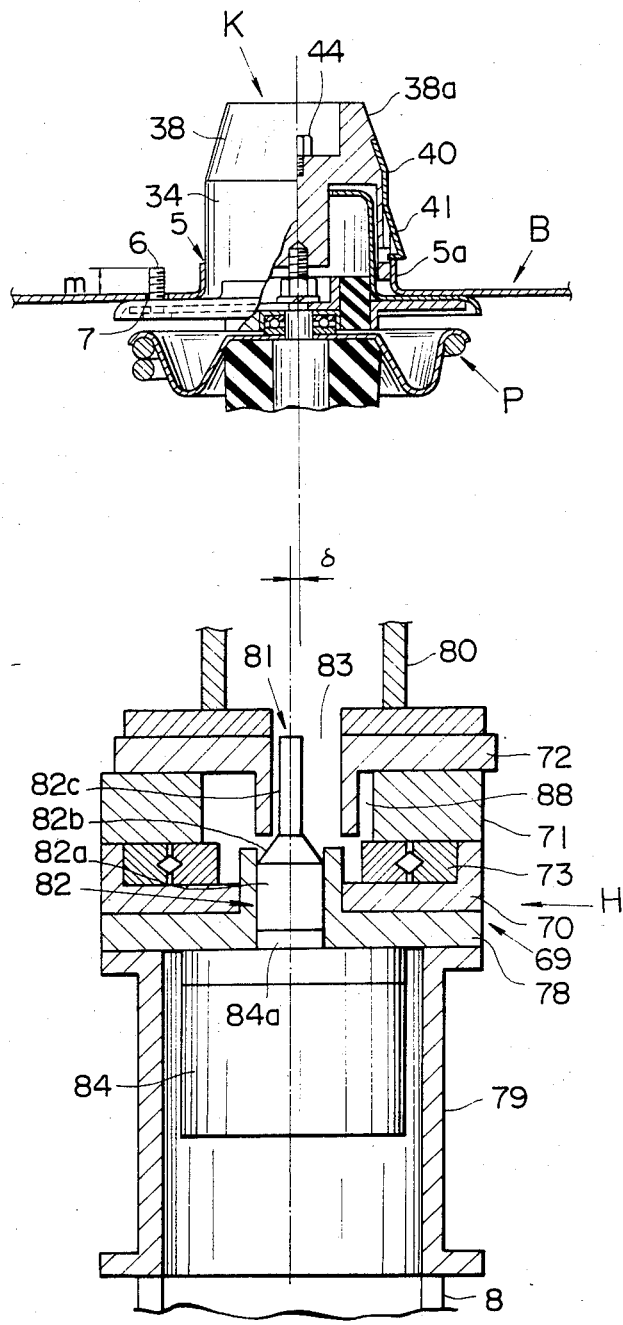
FIG. 20 is an elevation in partial section of essential parts of the engagement member, the strut, and the mechanical hand showing a step subsequent to that shown in FIG. 19 in which the bolt penetrates through an opposing hole provided in the vehicle body.

When the arm 8 of the first robot Ra rotates through this predetermined angle about the vertical axis of the end of the arm 8, the strut P rotates accordingly about the supporting shaft 52. Thus, the bolts 6 are pivoted in the direction A shown exaggeratedly in FIG. 19 while remaining in contact with the lower surface of the strut tower 4 until they reach the corresponding hole 7 of the vehicle body B. In that case, the bolts 6 are inserted through the respectively corresponding holes 7 as shown in FIG. 20 due to the biasing forces of the springs 54, 62. It should be noted that although the strut P is rotated through the predetermined angle greater than the set phase difference (in this embodiment two degrees) between the bolts 6 and the holes 7, rotation of the upper casing 3 of the strut P is prevented by the holes 7 through which the bolts 6 project so that only the cylinder Ps of the strut P is rotated further.

In this position, since the vertical axis of the strut P is held perpendicular to the lower surface of the strut tower 4, the extents of projection among the bolts 6 is substantially uniform, i.e., the strut P is accurately located at the specified position of the vehicle body B to which it is to be attached. In addition, when the bolts 6 first are inserted through the respective holes 7, the engagement member K moves upward. At this time, the lower end of the pawls 41 are raised above the upper edge of the flange 5a of the positioning hole 5. The pawls 41 then rebound elastically so as to project outward from the peripheral wall of the cylindrical base 34 so that the bent portions 41a of the pawls 41 engage the upper edge of the flange 5a around the positioning hole 5. At this stage, the strut P is detachably attached to the vehicle body B via the engagement member K.

Figure 21:
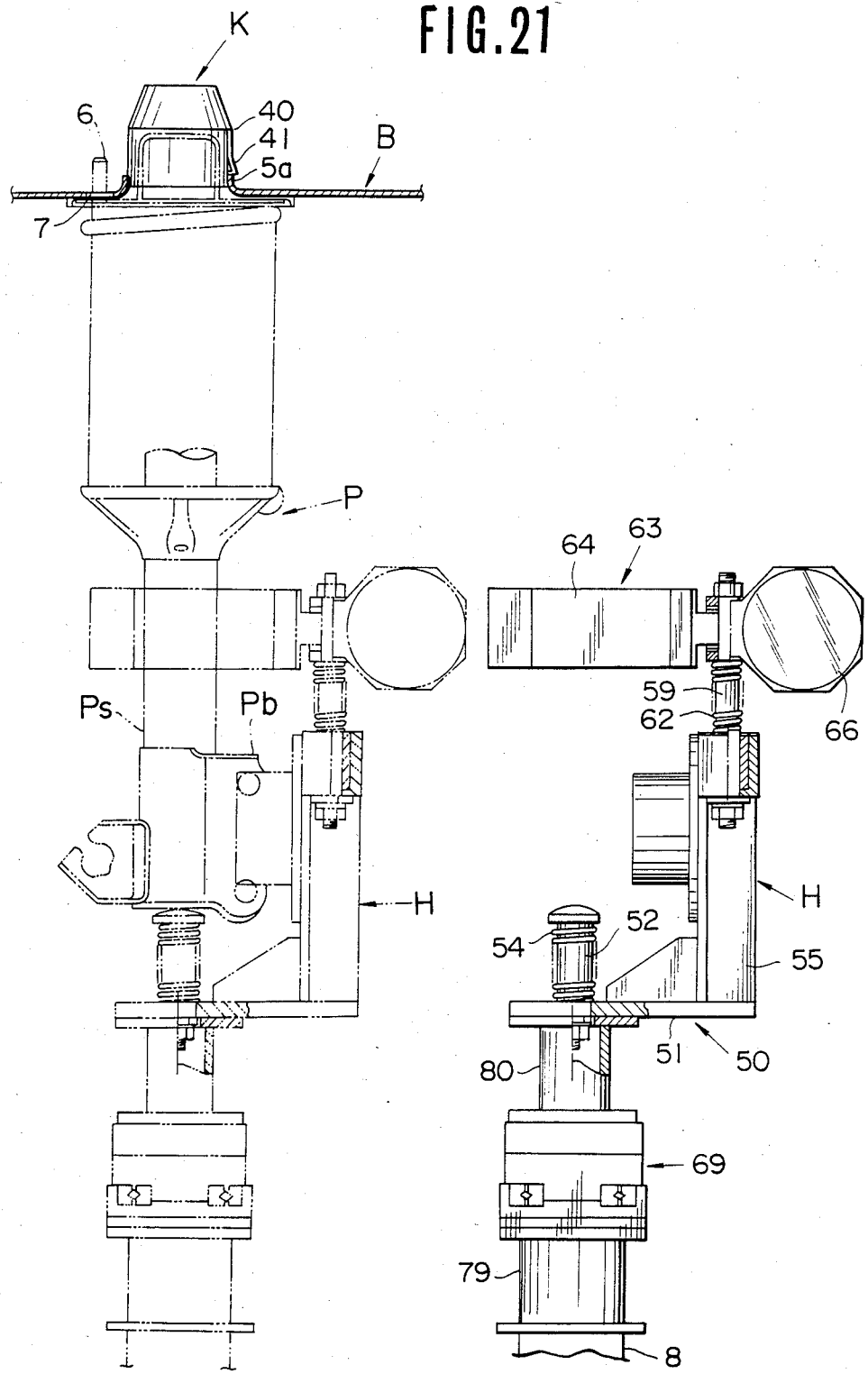
FIG. 21 is an elevation of the engagement member, the strut, the vehicle body, and the mechanical hand showing the completion of the process of detachably attaching the strut to the vehicle body by means of the engagement member.

Thereafter in a step $SP_{17}$, as seen in FIG. 21, the clamp member 63 is opened so that the cylinder Ps of the strut P is freed from the clamp member 63 and the robot Ra removes the mechanical hand H from the strut P, which is now detachably attached to the vehicle body B, so as not to interfere with the strut P in a subsequent step $SP_{18}$. Finally, the mechanical hand H is returned to its original start position to prepare for a subsequent identical process. Step $SP_{18}$ completes the operation at the first working station $ST_1$.

Thereafter, the vehicle body B to which the strut P is detachably attached is transported by the conveyor belt 1 to a second working station $ST_2$, as seen in FIG. 1.

Immediately thereafter, the second robot Rb operates the nut fastening tool N to receive nuts 10 from the nut feed 11, as seen in FIG. 1.

In more detail, a selection signal indicating the vehicle model of the vehicle body B is issued by the control unit. In a step $SP_{20}$ shown in FIG. 26(B), the movable nut runners 131 are suitably shifted and arranged in the desired positions on the movable plate 93 according to the vehicle model. Then in a step $SP_{21}$ in FIG. 26(B), the pneumatic cylinder 106 is actuated to drive the piston rod 106a outward by means of pneumatic power so that the locating pins 103 fit tightly into the corresponding holes 102. Thus the nut fastening tool N is fixed to the robot Rb. Thereafter in a step $SP_{22}$, the robot Rb carries the nut fastening tool N to the nut feed 11 and then in a step $SP_{23}$ the second robot Rb allows the sockets 143 of the nut fastening tool N to be loaded with nuts 10 from the nut feed 11. In steps $SP_{24}$ and $SP_{25}$, the second robot Rb waits at a predetermined position for the vehicle body B to arrive at the second work station $ST_2$.

Figure 22:
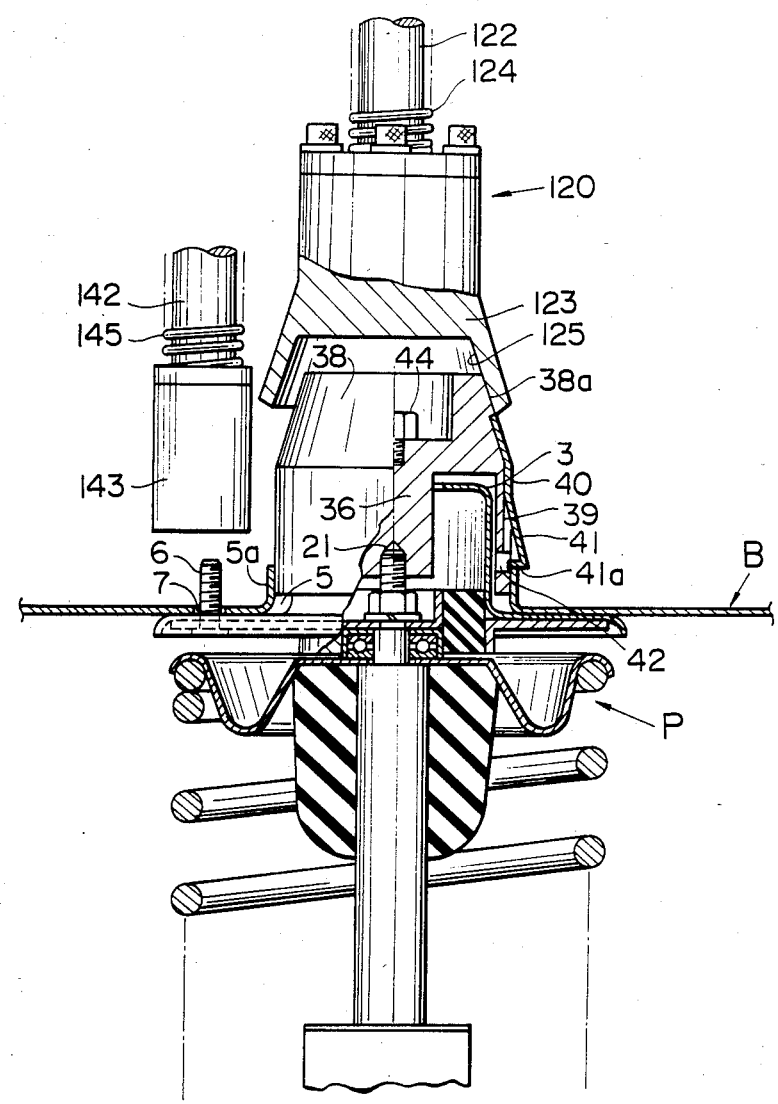
FIG. 22 is an elevation in partial section of essential parts of the engagement member, the strut, the vehicle body, and the nut fastening tool showing the step of positioning the nut fastening tool above the strut tower of the vehicle body.

A completion signal from the control unit (not shown) is issued when the vheicle body B stops at the second work station $ST_2$. In a step $SP_{26}$, the robot Rb then carries the nut fastening tool N to a position over the strut tower 4 as shown in FIG. 1 and FIG. 22. Since the accuracy of the stop position of the vehicle body B is lower than the operating accuracy of the robot Rb, the stopped position of the nut fastening tool N will usually deviate from that of the vehicle body B either forward or rearward along the conveyer belt 1.

Figure 11:
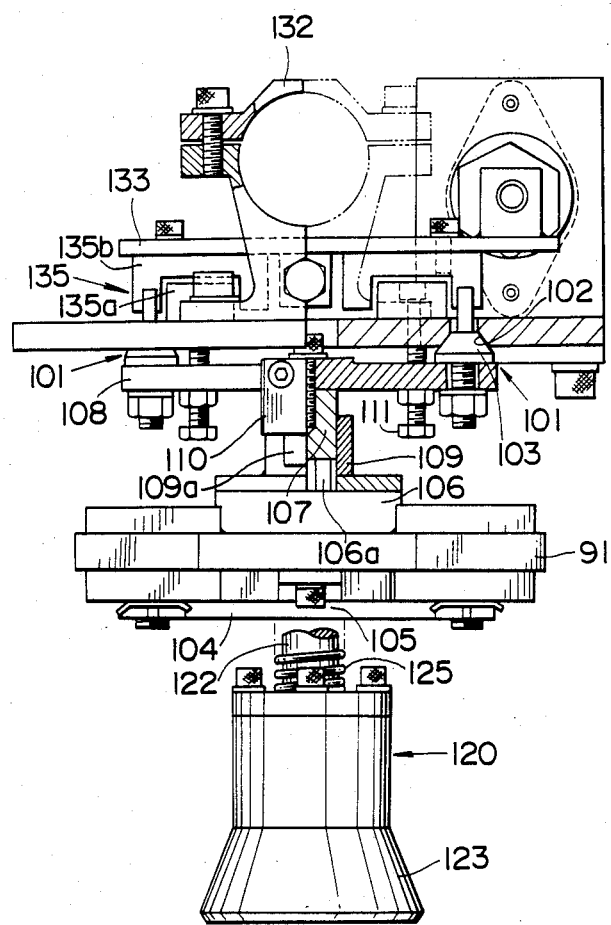
FIG. 11 is an elevation in partial section of the supporting apparatus of FIG. 10.
Figure 23:
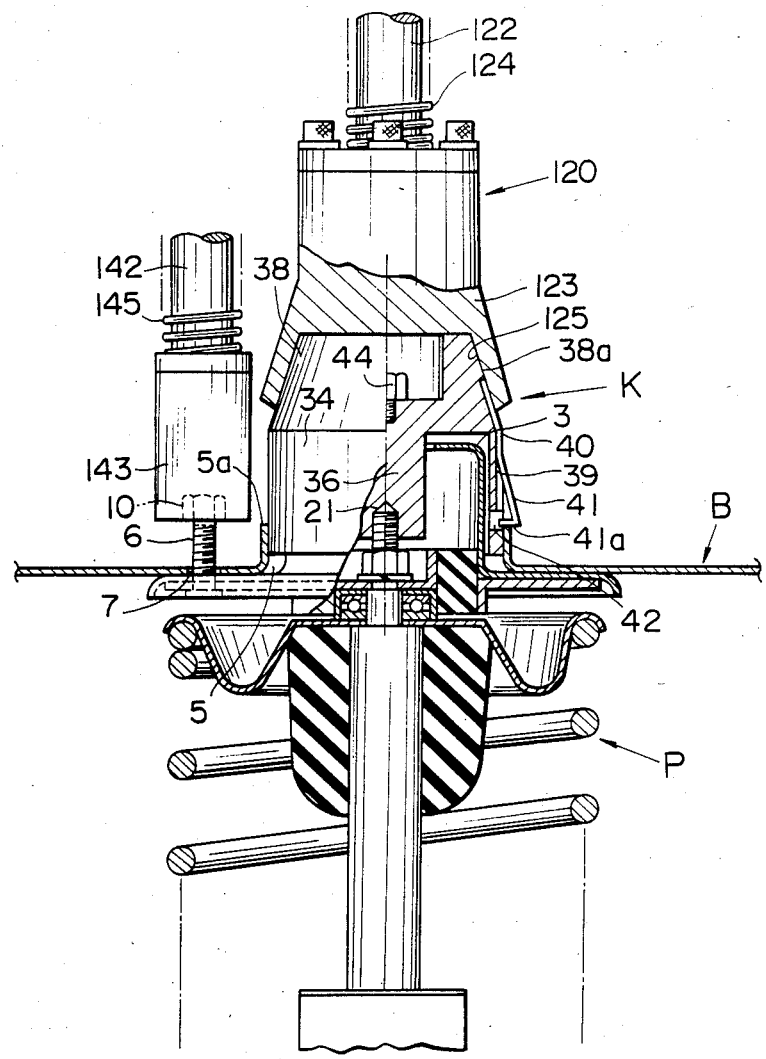
FIG. 23 is an elevation in partial section similar to FIG. 22 showing a step subsequent to that shown in FIG. 22 in which the nut fastening tool is positioned above the strut tower.
Figure 24:
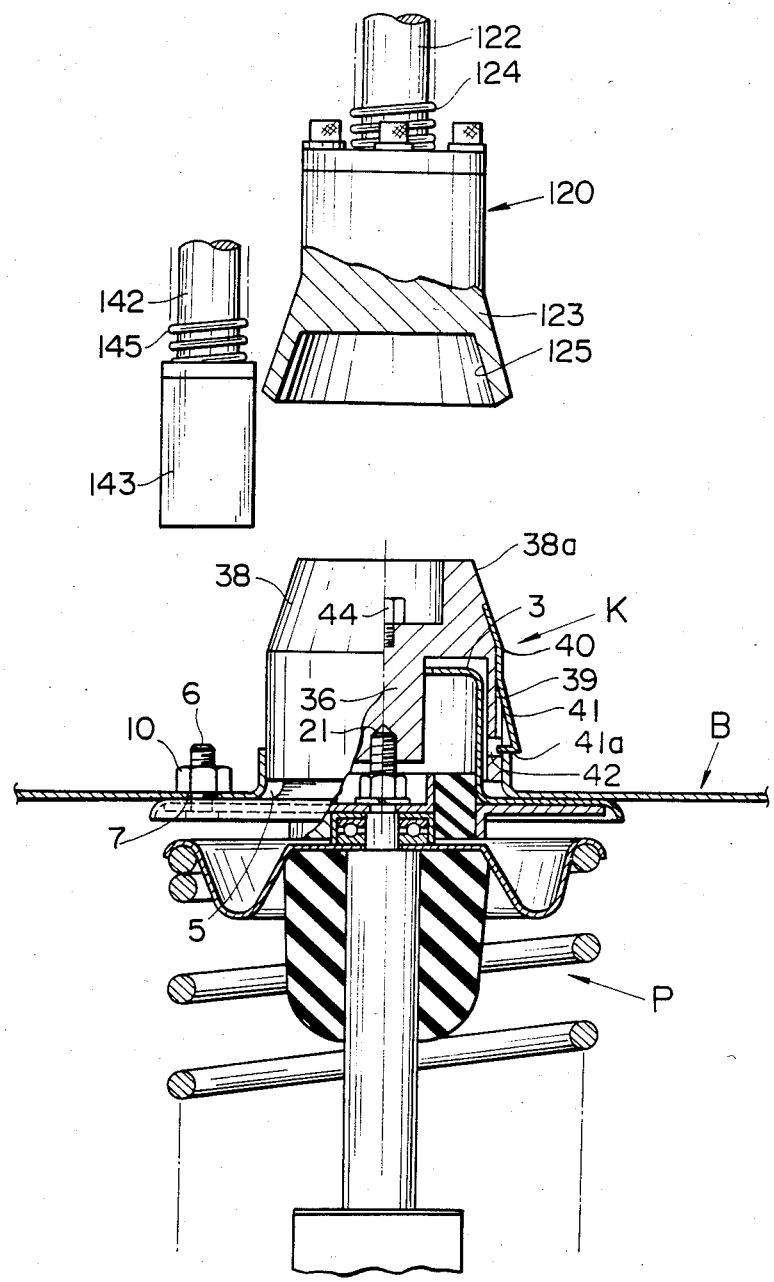
FIG. 24 is a view similar to FIG. 22 showing a step subsequent to that shown in FIG. 23 in which a nut is tightened onto the opening bolt and the nut fastening tool is removed from the strut.

Thereafter in a step $SP_{27}$, a command signal from the control unit causes the locating member 101, shown best in FIG. 11, to be unlocked. In more detail, the pneumatic cylinder 106 is deactivated to withdraw the piston rod 106a by means of negative pneumatic pressure so that the locating pins 103 are moved accordingly downward from the positions shown in FIG. 11, leaving only the cylindrical sections of the locating pins 103 projecting into the respective holes 102. The movable plate 93 is thereby supported by the floating mechanism 94 so as to allow free movement in the plane of the movable plate 93 within the range of clearance between each of the locating pins 103 and locating holes 102. Thereafter in a step $SP_{28}$ the second robot Rb moves the nut fastening tool N downward, so that the guide member 120 also moves downward. At this time, the inner peripheral wall of the guide recess 125 of the guide 123 is brought into contact with the guide portion 38 of the engagement member K. As the guide member 120 moves further downward, the edge of the guide recess 125 slides along the guide tapered surface 38a of the guide block 38, as shown in FIG. 22 and FIG. 23 so that the guide recess 125 finally fits over the guide portion 38 in such a way that the vertical axes of the guide block 123 and the guide portion 38 becomes colinear. During this step, the movable plate 93 which supports the guide member 120 via the bracket 121, shown best in FIG. 11, receives the force due to the displacement of the guide block 123 as it settles over the opposing guide portion 38 of the engagement member K to move the vertical axis of the guide block 123 into agreement with that of the guide portion 38. At this time, since the movable plate 93 is supported by the base plate 91 via the floating mechanism 94 so as to be free to move in the plane perpendicular to the vertical axis of the guide block 123 as appreciated from FIG. 11, the movable plate 93 moves with the guide block 123, compressing or extending the coil springs 98a.

At the same time, the bolts 6 projecting through respective holes 7 abut the lower surfaces of the individual nuts 10 held by the sockets 143 of the stationary and movable nut runner 130, 131 so that the sockets 143 are moved upward against the biasing force of the spring 145. Each socket 143 is equipped with a limit switch (not shown) which is tripped after a predetermined extent of upward displacement of the corresponding socket 143. When all of the limit switches have been tripped, the control unit outputs a second completion signal. The lowering step $SP_{28}$ is repeated until the completion signal is received, as represented by the decision step $SP_{29}$, at which time the arm 9, and thus the nut fastening tool, are stopped, as represented by step $SP_{30}$.

In a step $SP_{31}$, the rotational axles of the nut runners 130, 131 are then rotated in response to a command signal from the control unit, the control unit being responsive to the completion signal described above. At this time, each nut 10 within the socket 143 is tightened onto the opposing bolt 6. When the tightening torque of each nut exceeds a predetermined torque, a nut tightening detector (not shown) detects that the tightening torque has reached the predetermined value in a step $SP_{32}$ and in a step $SP_{33}$ the robot Rb causes the rotational axle of each nut runner 130, 131 to stop. During this step, as each nut 10 rotates spirally around the threaded portion of the corresponding bolt 6 and the lower surface of each nut 10 reaches the bottom of the threaded portion of the bolt 6, each bolt 6 will be pulled upward slightly so that the whole strut P is securely attached to the predetermined position of the vehicle body.

When a completion signal indicating that the predetermined number of nuts 10 have been tightened onto the respectively associated bolts 6 is issued by the control unit, the robot Rb raises the nut fastening tool N in a step $SP_{34}$ and then in a step $SP_{35}$ the robot Rb returns to its original start position to prepare for a subsequent identical process. At this stage, the operation at the second work station $ST_2$ is completed, with various elements of the nut fastening tool N and supporting apparatus S initialized in a step $SP_{36}$. These elements include the locating member 19 which must be relocked, the locating pins and the movable nut runners.

Figure 25:
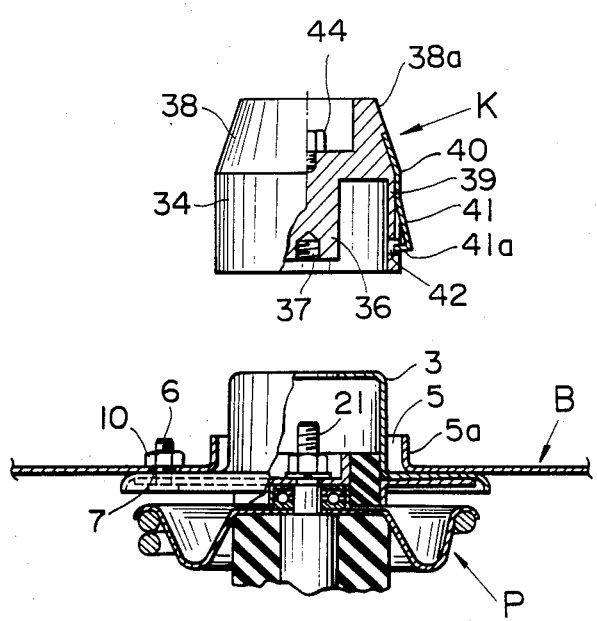
FIG. 25 is an elevation in partial section of essential parts of the assembled strut and the engagement member showing a final step in which the engagement member is removed from the strut.

Thereafter, the operation of attaching strut P to the vehicle body B is completed by removing the engagement member K from the upper casing 3 with an appropriate tool (not shown) engageable with the bolt 44 as seen in FIG. 25. This may be done at the second work station $ST_2$ or any subsequent station.

It should be noted that if the head shape of the bolt 44 matches the profile of the nuts tightened onto the bolt 6 with the fastening tool 15, it is possible to use the nut fastening tool N to remove the engagement member K from the upper casing 3 of the strut P.

Figure 27:
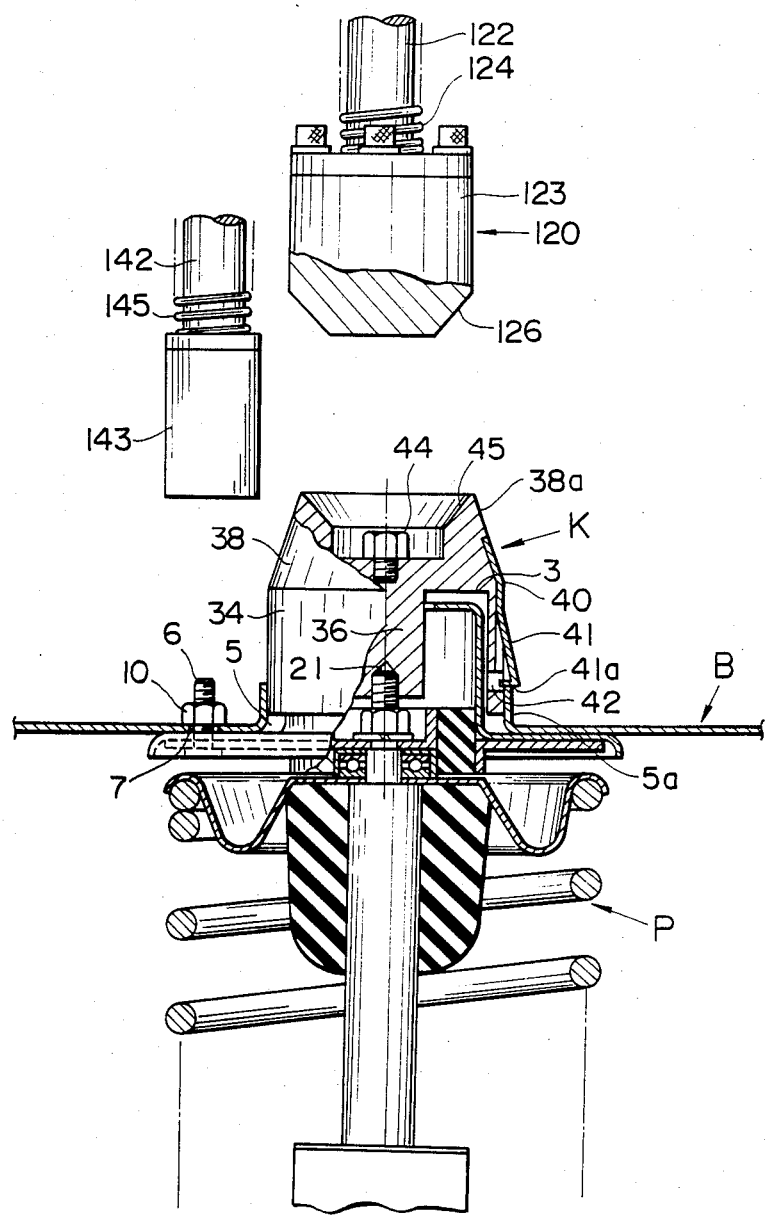
FIG. 27 is an elevation similar to FIG. 24 showing a variation of the step of positioning the nut fastening tool above the strut tower.

In this embodiment, although the guide portion 38 of the engagement member K functions both to guide the strut P through the positioning hole 5 of the vehicle body B and to position the nut fastening tool N over the positioning hole 5, the guide portion 38 may alternatively serve only one function such as guiding the strut P to the positioning hole 5. That is to say, the guide portion 38 may be provided with the aforementioned guide tapered portion 38a for guiding the strut P into the strut tower 3 and an additional positioning recess 45 in the form shown in FIG. 27 within the cylindrical recess 43 to act as the positioning part of the nut fastening tool N with respect to the vehicle body B. In this case, a guide taper 126 as shown in FIG. 27 should be formed at the tip of the guide block 123 opposite to the engagement member K in order to fit tightly into the opposing recess 45.

In addition, although the function to guide the strut P to the positioning hole 5 is served by the engagement member K in the above-described embodiment, this function is not absolutely necessary if the positioning between the engagement member K and vehicle body B can be performed accurately. Similarly, the positioning function of the nut fastening tool N needs not always be performed by the above-described engagement member K. Alternatively, direct positioning between the vehicle body B and nut fastening tool N may be carried out. Therefore, any appropriate design modification may be made provided that the engagement member K at least serves the function of engaging the positioning hole 5 of the vehicle body B.

On the other hand, although in the above-described embodiment the mechanical hand main frame 50 of the mechanical hand H is so constructed that the lower end of the strut P is supported by the supporting shaft 52, the supporting shaft 52 is not specifically needed and the strut P may be grasped solely by the clamp member 63, the lower end of the strut P being freely suspended. Although the clamp member 63 comprises a pair of clamp arms 64, any appropriate design modification may be made as long as the clamp member 62 is so constructed as to be able to firmly retain the axle Ps, i.e., cylinder of the strut P. Furthermore, the floating mechanism 69 may alternatively be provided between the clamp member 63 and mechanical hand main frame 50. The structure of the lock member 81 may be changed on the condition that it serves to block movement of the floating mechanism 69. Any appropriate design changes may be made to the supporting mechanism of the movable plate 93. Still furthermore, it should be noted that although in the above-described preferred embodiment the floating mechanisms 69, 94 are provided within the mechanical hand H and supporting apparatus S of the nut fastening tool N, respectively, such floating mechanisms are not specifically necessary. For example, if the two robots Ra, Rb are of SCARA type and the appropriate robot axes are freed while the engagement member is being attached to the strut P and while the nut fastening tool is being guided to the vehicle body, these robots themselves can function as the floating mechanisms. Although in the above-described embodiment the strut P is detachably attached to the vehicle body B via the engagement member K, an engagement part having the same function as the engagement member K may be integral to the strut P itself so that the strut P can be attached directly to the vehicle body. Although in the above-described embodiment the process of detachably attaching the strut P and the process of tightening the nuts 10 to the bolts 6 were carried out in different work stations $ST_1$, $ST_2$, these two processes may be carried out in the same working station. Finally, although in the above-described embodiment the strut P has been used as the sole example of the workpiece, the present invention can be applied to attaching operations for any type of vehicle part. In this case, if welded nuts are used in such a vehicle part in place of the bolts, bolts will be used as fasteners and an automatic bolt fastening tool will be used in place of the nut fastening tool.

As described previously, since according to the present invention one robot moves a vehicle part to which an engagement part is previously incorporated to the vehicle body to detachably attach the vehicle part to the vehicle body and thereafter another robot moves a fastening tool to the vehicle body to which the vehicle part is detachably attached to tighten fasteners onto opposing fasteners, it is possible for the first robot controlling the vehicle part to release the vehicle part during the tightening operation of the fasteners so that adequate working space can be secured for the other robot. Consequently, the teaching of the second robot can be simplified. In addition, since it is possible to carry out the process of detachably attaching the vehicle part to the vehicle body at different working stages, the required time at each work stage can be shortened. Therefore, in a case where a tact-type conveyer system, i.e., a conveyer which moves a fixed distance and then stops for a fixed length of time, is used and the process of attachment of the vehicle part takes the longest time among the vehicle assembly processes, the total production time can be shortened.

Furthermore, since the automatic attachment system according to the present invention is so constructed that the engagement member is removably attached to the vehicle part and the engagement member serves to detachably attach the vehicle part to the vehicle body, it is not necessary to modify the structure of the vehicle part and conventional vehicle parts can be attached directly to the vehicle body.

In addition, in the case of the preferred embodiment, since the engagement member has a guide and the mechanical arms have floating mechanisms which facilitate positioning of the vehicle part accurately with respect to the vehicle body and of the fastening tool with respect to the attached vehicle part, teaching errors of the robot can be compensated by means of such guide portion. Consequently, the robot does not require high-precision teaching, e.g., through a continuous path control system.

Furthermore, since the guide member is integral to the engagement member of the vehicle part, it is not necessary to provide special positioning elements in the vehicle body. Consequently, it is not necessary to add special design modifications to the vehicle body.

It will be clearly understood by those skilled in the art that the foregoing description is in terms of preferred embodiments wherein various changes and modifications may be made without departing from the scope of the present invention, which is to be defined by the appended claims.

What is claimed is:

1. A method for automatically attaching a sub-assembly to a main assembly by means of at least one fastener, comprising the step of:
    (a) carrying the sub-assembly from a first position to a second position relative to a predetermined location of the main assembly at which the subassembly is attached with a first robot placed at a first work station;
    (b) removably attaching the sub-assembly with the first robot at the first work station;
    (c) moving the main assembly to a second work station which is at a predetermined distance remote from the first work station upon completion of the removable attachment of the sub-assembly to the predetermined location of the main assembly in step (b), the predetermined distance being at least a limit of distance within which the first robot moves;
    (d) carrying an automatic fastening tool toward the predetermined location of the main assembly so as to position the automatic fastening tool on the sub-assembly with a second robot placed at the second work station; and
    (e) tightening a fastener onto the sub-assembly with the automatic fastening tool attached to the second robot so as to permanently attach the subassembly to the predetermined location on the main assembly.

2. The automatic attaching method according to claim 1, wherein the sub-assembly is provided with a detachable engagement means for positioning the subassembly with respect to the predetermined location on the main assembly and anchoring the sub-assembly to the predetermined location on the main assembly in said step (b) and for positioning the automatic fastening tool on the predetermined location on the main assembly in said step (d).

3. The automatic attaching method according to claim 1, wherein steps (a) and (b) further includes:

grasping the sub-assembly with a mechanism lockable to cause the sub-assembly to move with the mechanism and unlockable to allow the sub-assembly to move freely with respect to the mechanism only along at least one axis of translation;

locking the mechanism;

moving the mechanism to a predetermined point from which the sub-assembly could be moved along an axis perpendicular to said at least one axis of translation to reach said predetermined location on the main assembly within a known range of error;

unlocking the mechanism;

moving the mechanism along said perpendicular axis so as to move the sub-assembly toward said predetermined location on the main assembly and simultaneously guiding the sub-assembly along said at least one axis of translation toward said predetermined location so as to correct possible errors within said known range of error, said engagement means engaging the main assembly at said predetermined location near the limit of movement of the mechanism along said perpendicular axis.

4. The automatic attaching method according to claim 1, wherein step (d) includes the steps of moving the fastening tool to a predetermined point from which the fastening tool can reach the opposite side of said predetermined location on the main assembly within a known range of error by movement solely along one axis of translation; and moving the fastening tool along said axis while allowing the fastening tool to move freely along at least one axis perpendicular to said axis and simultaneously guiding the fastening tool along said at least one perpendicular axis so as to correct any error within said range of error.

* * * * *